US012794576B2

(12) United States Patent
Niu et al.

(10) Patent No.: US 12,794,576 B2
(45) Date of Patent: Nov. 10, 2026

(54) MEASUREMENT METHOD AND APPARATUS, DEVICE, AND STORAGE MEDIUM

(71) Applicant: ZTE CORPORATION, Guangdong (CN)

(72) Inventors: Li Niu, Guangdong (CN); Bo Dai, Guangdong (CN); Xiubin Sha, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 260 days.

(21) Appl. No.: 17/917,190

(22) PCT Filed: Apr. 6, 2021

(86) PCT No.: PCT/CN2021/085700
§ 371 (c)(1),
(2) Date: Oct. 5, 2022

(87) PCT Pub. No.: WO2021/204120
PCT Pub. Date: Oct. 14, 2021

(65) Prior Publication Data

US 2023/0144979 A1 May 11, 2023

(30) Foreign Application Priority Data

Apr. 9, 2020 (CN) ......................... 202010276303.1

(51) Int. Cl.
*H04B 17/309* (2015.01)
*H04B 17/327* (2015.01)
(Continued)

(52) U.S. Cl.
CPC ......... *H04B 17/327* (2015.01); *H04B 17/336* (2015.01); *H04L 5/0005* (2013.01); *H04L 5/0073* (2013.01); *H04W 24/10* (2013.01)

(58) Field of Classification Search
None
See application file for complete search history.

(56) References Cited

U.S. PATENT DOCUMENTS

2011/0188396 A1* 8/2011 Jung ..................... H04W 24/10 370/252
2015/0189560 A1* 7/2015 Ji ..................... H04W 36/0088 370/331

(Continued)

FOREIGN PATENT DOCUMENTS

CN 101360310 A 2/2009
CN 101651961 A 2/2010

(Continued)

OTHER PUBLICATIONS

International Search Report for PCT/CN2021/085700, mailed Jun. 30, 2021, 5 pages.

(Continued)

*Primary Examiner* — Scott M Sciacca
(74) *Attorney, Agent, or Firm* — KDW FIRM PLLC

(57) ABSTRACT

Provided are a measurement method and apparatus, a device, and a storage medium. The measurement method includes: receiving a preset measurement condition configured by a second communication node; and enabling measurement on a neighbor cell corresponding to a serving cell where a first communication node is located according to the preset measurement condition.

4 Claims, 5 Drawing Sheets

(51) Int. Cl.

| | |
|---|---|
| ***H04B 17/336*** | (2015.01) |
| ***H04L 5/00*** | (2006.01) |
| ***H04W 24/10*** | (2009.01) |

(56) References Cited

U.S. PATENT DOCUMENTS

| | | | | |
|---|---|---|---|---|
| 2017/0064588 | A1 | 3/2017 | Dong et al. | |
| 2019/0289504 | A1 | 9/2019 | Kim | |
| 2020/0137605 | A1* | 4/2020 | Liu | H04W 36/00 |
| 2020/0213884 | A1* | 7/2020 | Chen | H04W 36/0094 |
| 2020/0288417 | A1* | 9/2020 | Harada | H04W 56/001 |
| 2020/0313838 | A1* | 10/2020 | Jin | H04W 48/12 |
| 2020/0314868 | A1* | 10/2020 | Tseng | H04W 8/08 |
| 2020/0396765 | A1* | 12/2020 | Liang | H04L 5/0057 |
| 2021/0168678 | A1* | 6/2021 | Deenoo | H04W 36/0085 |
| 2021/0306884 | A1* | 9/2021 | Dalsgaard | H04W 24/08 |
| 2022/0007235 | A1* | 1/2022 | Liu | H04W 28/0967 |
| 2022/0095134 | A1* | 3/2022 | Shi | H04W 48/16 |
| 2022/0110032 | A1* | 4/2022 | Zheng | H04W 36/0085 |
| 2022/0182868 | A1* | 6/2022 | Rugeland | H04W 76/15 |
| 2023/0058706 | A1* | 2/2023 | Liang | H04W 74/0833 |
| 2023/0144865 | A1* | 5/2023 | Li | H04L 5/001 370/329 |

FOREIGN PATENT DOCUMENTS

| | | | | | |
|---|---|---|---|---|---|
| CN | 101925086 | A | | 12/2010 | |
| CN | 102026271 | A | | 4/2011 | |
| CN | 102869025 | A | | 1/2013 | |
| CN | 102905288 | A | | 1/2013 | |
| CN | 103391572 | A | | 11/2013 | |
| CN | 107809769 | A | * | 3/2018 | H04W 36/0061 |
| CN | 108966244 | A | | 12/2018 | |
| CN | 109121175 | A | | 1/2019 | |
| CN | 109769271 | A | | 5/2019 | |
| CN | 111901810 | A | | 11/2020 | |
| WO | 2012136041 | A1 | | 10/2012 | |
| WO | 2019032008 | A1 | | 2/2019 | |
| WO | 2020067763 | A1 | | 4/2020 | |

OTHER PUBLICATIONS

Nokia Shanghai Bell, "Idle mode ANR Measurements for NB-IoT," 3GPPTSG RAN WG2 Meeting #106, May 17, 2019.

Japanese Office Action for Application No. 2022561620 dated Jul. 18, 2023.

Huawei, HiSilicon, "Remaining issues on time domain measurement relaxation," R2-1913568, 3GPP TSG-RAN WG2 Meeting 107bis, Agenda item: 6.11.6 (Oct. 2019) 13 pages.

LG Electronics Inc., "Considerations on criteria and ways of performing measurement relaxation," R2-1913340, 3GPP TSG-RAN WG2 Meeting #107bis, Agenda Item: 6.11.6 (Oct. 2019) 5 pages.

Vivo, "Further considerations on NR UE power saving RRM," R4-1913995, 3GPP TSG-RAN WG4 Meeting#93, Agenda Item: 9.7.3.1 (Nov. 2019) 4 pages.

Vivo, "RRM measurement relaxation criteria," R2-1912334, 3GPP TSG-RAN WG2 Meeting #107bis, Agenda Item: 6.11.6 (Oct. 2019) 5 pages.

Partial Supplementary European Search Report in EP Application No. 21785285.4, issued Jul. 5, 2024, 19 pages.

Chinese Office Action in CN Application No. 202010276303.1 dated Aug. 11, 2025, 9 pages.

3rd Generation Partnership Project, "User Equipment (UE) procedures in Idle mode and RRC Inactive state," 3GPP TS 38.304, V1.0 (Release 1) 1-36 (Mar. 2020).

Chinese Office Action in CN Application No. 202010276303.1 dated Feb. 10, 2026, 9 pages.

* cited by examiner

| | |
|---|---|
| R | Measurement identification |

| | |
|---|---|
| R | Measurement occasion |

| | |
|---|---|
| R | Activation measurement identification |

| | |
|---|---|
| R | Activation measurement frequency index 1 |
| Activation measurement frequency index 2 | Activation measurement frequency index 3 |
| ...... | |
| Activation measurement frequency index N | |

| | |
|---|---|
| R | Bit string |
| ...... | |

MEASUREMENT METHOD AND APPARATUS, DEVICE, AND STORAGE MEDIUM

CROSS-REFERENCES TO RELATED APPLICATIONS

This is a national stage application filed under 37 U.S.C. 371 based on International Patent Application No. PCT/CN2021/085700, filed Apr. 6, 2021, which claims priority to Chinese Patent Application No. 202010276303.1 filed Apr. 9, 2020, the disclosures of which are incorporated herein by reference in their entireties.

TECHNICAL FIELD

The present application relates to the field of communication, for example, a measurement method and apparatus, a device, and a storage medium.

BACKGROUND

In an idle state, a Narrow Band Internet of Things (NB-IoT) terminal is in the overlapping coverage of multiple cells, and the NB-IoT terminal performs measurement on the frequencies and neighbor cells according to frequencies of intra-frequency and inter-frequency and neighbor cells broadcasted via system information to obtain a measurement result, and selects one cell to camp on according to a cell selection principle. When the NB-IoT terminal enters a connection state, the terminal continuously measures the local area. However, for the measurement performed on the neighbor cells, on the one hand, a very slow terminal moving speed is considered, on the other hand, the periodic measurement consumes a lot of power. Therefore, the NB-IoT terminal does not support to perform measurement on other frequencies and neighbor cells. The NB-IoT terminal performs a radio link monitoring process on downlink signals in the local area. When the NB-IoT terminal finds that the signal quality in the local area deteriorates, a radio link failure is triggered, and then the NB-IoT terminal initiates a Radio Resource Control (RRC) re-establishment process. After initiating the RRC re-establishment process, the NB-IoT terminal performs a cell reselection process, performs the search and measurement process according to the frequencies and neighbor cells configured by the base station, obtains the measurement result of the cell, selects a target cell according to the cell selection principle, and initiates the RRC re-establishment process for the target cell. However, in the process of initiating RRC re-establishment, the process of cell search and cell measurement performed by the terminal is very long, and the longest period may be greater than or equal to 14 seconds, thereby causing long service interruption.

SUMMARY

The present application provides a measurement method and apparatus, a device, and a storage medium, so as to reduce the interruption time of an RRC re-establishment process and reduce the time for searching and measuring neighbor cells.

An embodiment of the present application provides a measurement method. The measurement method is applied to a first communication node and includes the following.

A preset measurement condition configured by a second communication node is received; and measurement on a neighbor cell corresponding to a serving cell where the first communication node is located is enabled according to the preset measurement condition.

An embodiment of the present application further provides a measurement method. The measurement method is applied to a first communication node and includes the following.

Uplink data carrying strongest neighbor cell information of the first communication node is sent to a second communication node.

An embodiment of the present application further provides a measurement method. The measurement method is applied to a second communication node and includes the following.

A preset measurement condition is configured, where the preset measurement condition is configured for enabling measurement on a neighbor cell corresponding to a serving cell where a first communication node is located; and the preset measurement condition is sent to the first communication node.

An embodiment of the present application further provides a measurement apparatus. The measurement apparatus is applied to a first communication node and includes a receiver and a measurement enabling module.

The receiver is configured to receive a preset measurement condition configured by a second communication node. The measurement enabling module is configured to enable measurement on a neighbor cell corresponding to a serving cell where the first communication node is located according to the preset measurement condition.

An embodiment of the present application further provides a measurement apparatus. The measurement apparatus is applied to a first communication node and includes a transmitter.

The transmitter is configured to send uplink data carrying strongest neighbor cell information of the first communication node to a second communication node.

An embodiment of the present application further provides a measurement apparatus. The measurement apparatus is applied to a second communication node and includes a first configuration module and a transmitter.

The first configuration module is configured to configure a preset measurement condition, where the preset measurement condition is configured for enabling measurement on a neighbor cell corresponding to a serving cell where a first communication node is located. The transmitter is configured to send the preset measurement condition to the first communication node.

An embodiment of the present application further provides a device. The device includes a communication module, a memory, and one or more processors. The communication module is configured to perform communication interaction between a first communication node and a second communication node. The memory is configured to store one or more programs. When executing the one or more programs, the one or more processors perform the measurement method according to any of the preceding embodiments.

An embodiment of the present application further provides a storage medium. The storage medium is configured to store a computer program, where the computer program, when executed by a processor, causes the processor to perform the measurement method according to any of the preceding embodiments.

DETAILED DESCRIPTION

Embodiments of the present application are described below in conjunction with drawings.

Figure 1:
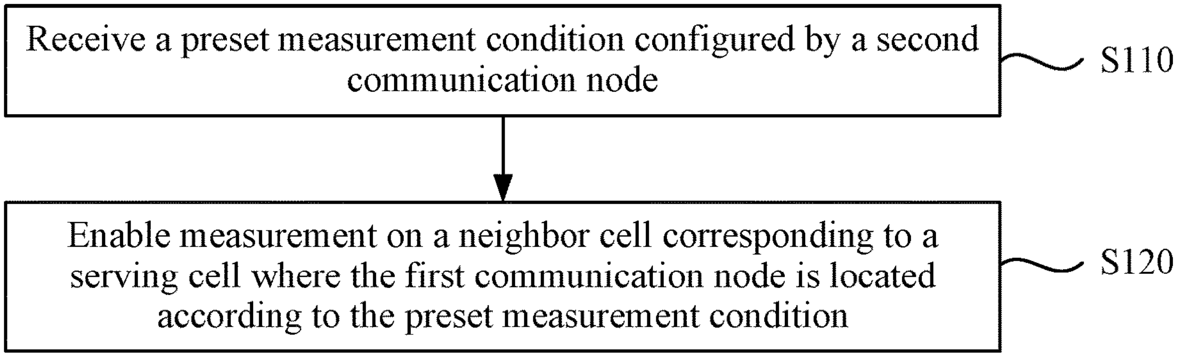
FIG. 1 is a flowchart of a measurement method according to an embodiment of the present application.

FIG. 1 is a flowchart of a measurement method according to an embodiment of the present application. This embodiment is applied to a first communication node. Exemplarily, the first communication node is a terminal (for example, a user equipment (UE)). As shown in FIG. 1, this embodiment includes S110 and S120.

In S110, a preset measurement condition configured by a second communication node is received.

In S120, measurement on a neighbor cell corresponding to a serving cell where the first communication node is located is enabled according to the preset measurement condition.

In an embodiment, the second communication node configures the preset measurement condition for the first communication node, and only in the case where the first communication node satisfies the preset measurement condition, the measurement on the neighbor cell corresponding to the serving cell is enabled, thereby saving the power consumption of the first communication node and reducing the interruption time of an RRC re-establishment process.

In an embodiment, the preset measurement condition includes one of: satisfying a trigger condition for enabling intra-frequency measurement or inter-frequency measurement; validity of a measurement value; measurement configuration information; or neighbor cell time-frequency information.

In an embodiment, a trigger condition for the validity of the measurement value refers to that in the case where measurement values of intra-frequency, inter-frequency, a frequency or the neighbor cell satisfy a preset condition, measurement does not need to be performed on the intra-frequency, the inter-frequency, the frequency or the neighbor cell. That is, in the case where the first communication node satisfies the trigger condition for enabling the intra-frequency measurement or the inter-frequency measurement, the first communication node may continue to perform the intra-frequency measurement and the inter-frequency measurement, thereby repeatedly triggering the measurement on the neighbor cell, resulting in the increase of the power consumption of the first communication node. For this reason, in the case where the trigger condition for enabling the intra-frequency measurement or the inter-frequency measurement is satisfied, the measurement time or measurement times are limited, that is, in the case where the neighbor cell measurement time or neighbor cell measurement times do not satisfy the preset condition, the measurement on the neighbor cell does not need to be enabled, thereby reducing the power consumption of the first communication node.

In an embodiment, in the case where the trigger condition for enabling the intra-frequency measurement or the inter-frequency measurement is that a signal quality of the serving cell where the first communication node is located deteriorates, a method for determining the deterioration of the signal quality of the serving cell where the first communication node is located includes at least one of: within a first preset time, the signal quality of the serving cell being less than or equal to a first preset threshold; within a second preset time, a downlink radio link quality of the serving cell being less than or equal to a second preset threshold; Radio Resource Control (RRC) receiving an out of sync indication reported by a physical layer; within a third preset time, a number of out of sync indications reported by the physical layer and received by the RRC being greater than or equal to a third preset threshold; a number of out of sync indications reported by the physical layer and continuously received by the RRC being greater than or equal to a fourth preset threshold; with a fourth preset time, a number of undetected Physical Downlink Control Channels (PDCCHs) being greater than or equal to a fifth preset threshold; a number of continuously undetected PDCCHs being greater than or equal to a sixth preset threshold; a maximum number of repetitions of a Narrow Physical Downlink Control Channel (NPDCCH) being greater than or equal to a seventh preset threshold; a maximum number of repetitions of a Narrow Physical Downlink Shared Channel (NPDSCH) being greater than or equal to an eighth preset threshold; a retransmission rate of a Hybrid Automatic Repeat reQuest (HARD) being greater than or equal to a ninth preset threshold; within a fifth preset time, a signal quality variation value of the serving cell being greater than or equal to a tenth preset threshold; a signal quality of an intra-frequency neighbor cell being less than or equal to an eleventh preset threshold and the inter-frequency measurement is enabled; or a duration of enabling the intra-frequency measurement or the inter-frequency measurement being greater than or equal to a twelfth preset threshold.

In an embodiment, the signal quality of the serving cell or the neighbor cell is represented by at least one of parameters: a Reference Signal Receiving Power (RSRP) value; a Reference Signal Receiving Quality (RSRQ) value; or a Signal to Interference plus Noise Ratio (SINR) value.

In an embodiment, the downlink radio link quality of the serving cell is represented by at least one of parameters: an RSRP value; or a Block Error Rate (BLER) value.

In an embodiment, a condition for determining the validity of the measurement value includes at least one of: a measurement end duration reaches a thirteenth preset threshold; a duration of enabling search or measurement reaches a fourteenth preset threshold; a signal quality variation value of the serving cell reaches a fifteenth preset threshold; or current measurement times of the intra-frequency or the inter-frequency are less than or equal to a sixteenth preset threshold. The validity of the measurement value refers to that in the case where measurement values of intra-frequency, inter-frequency, a frequency or the neighbor cell satisfy a preset condition, measurement does not need to be performed on the intra-frequency, the inter-frequency, the frequency or the neighbor cell.

In an embodiment, the measurement method applied to the first communication node further includes reporting uplink data carrying a neighbor cell measurement state indication to the second communication node, where the neighbor cell measurement state indication includes at least one of: an indication of satisfying the intra-frequency measurement or the inter-frequency measurement; an indication of about to enable the intra-frequency measurement or the inter-frequency measurement; or an indication of a request for enabling the intra-frequency measurement or the inter-frequency measurement.

In an embodiment, the uplink data carrying the neighbor cell measurement state indication includes one of: a random access preamble; a Physical Uplink Control Channel (PUCCH) message; a Media Access Control-Control Element (MAC CE) message; or an RRC message.

In an embodiment, after the uplink data carrying the neighbor cell measurement state indication is reported to the second communication node, the method further includes the following.

An enabling occasion of the inter-frequency measurement is determined, where a method for determining the enabling occasion includes one of: using a first preset occasion after the uplink data is successfully sent as the enabling occasion; using an occasion of successfully receiving feedback information of the second communication node as the enabling occasion; or using a second preset occasion carried in the uplink data as the enabling occasion.

In an embodiment, the measurement method applied to the first communication node further includes determining an inter-frequency measurement occasion, where the inter-frequency measurement occasion includes an occasion when the first communication node does not transmit data to the second communication node, or an occasion when the first communication node does not receive data from the second communication node.

In an embodiment, a method for determining the inter-frequency measurement occasion includes one of: within a sixth preset time, the MAC not receiving or sending an MAC Service Data Unit (SDU) message; within a seventh preset time, a buffer of Radio Link Control (RLC) or MAC is empty; or a service delay being greater than or equal to a seventeenth preset threshold.

In an embodiment, the measurement configuration information includes one of: first measurement configuration information carried in an RRC message; second measurement configuration information carried in the RRC message; measurement configuration information activated by an MAC CE message; or measurement configuration information activated by a Downlink Control Information (DCI) message.

In an embodiment, the first measurement configuration information includes a measurement frequency value and a cell selection parameter under each frequency; and the second measurement configuration information includes a measurement frequency index.

In an embodiment, the measurement configuration information activated by the MAC CE message includes one of: an activation measurement identification bit carried in the MAC CE message; an activation measurement frequency index carried in the MAC CE message; or a bit string carried in the MAC CE message; where the activation measurement identification bit is configured for indicating whether the intra-frequency measurement and/or the inter-frequency measurement is activated; and the bit string is configured for indicating that whether measurement on a certain frequency represented by a bit is enabled.

In an embodiment, the measurement configuration information activated by the DCI message includes one of: an activation measurement identification bit carried in the DCI message; an activation measurement frequency index carried in the DCI message; or a bit string carried in the DCI message; where the activation measurement identification bit is configured for indicating the intra-frequency measurement and/or the inter-frequency measurement is activated; and the bit string is configured for indicating that whether measurement on a certain frequency represented by a bit is enabled.

In an embodiment, the neighbor cell time-frequency information is time-frequency information of an intra-frequency or inter-frequency neighbor cell broadcasted by system information or configured by an RRC message.

In an embodiment, the neighbor cell time-frequency information includes a time domain position of a measurement occasion or a transmission occasion of a measurement signal; and a frequency domain position of a measurement frequency, a measurement bandwidth or the measurement signal.

Figure 2:
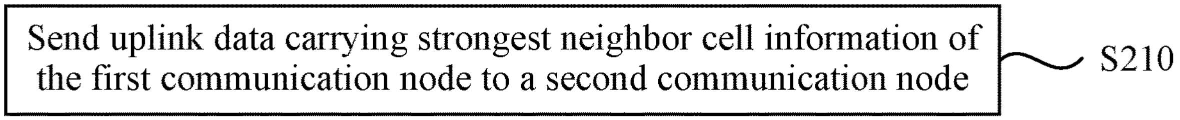
FIG. 2 is a flowchart of another measurement method according to an embodiment of the present application.

During the process in which the second communication node configures measured neighbor cells for the first communication node, if the second communication node configures all neighbor cells near the serving cell where the first communication node is located to the first communication node and the first communication node performs measurement on the all neighbor cells, the power consumption of the first communication node is increased and the measurement efficiency is reduced. In view of this, the present application provides a measurement method. When the first communication node reports neighbor cell information, only the strongest neighbor cell near the serving cell where the first communication node is located is reported so that the second communication node configures corresponding measurement configuration information according to the strongest neighbor cell, and then the first communication node performs measurement on the strongest neighbor cell according to the measurement configuration information of the strongest neighbor cell, thereby improving the effectiveness of the measurement. FIG. 2 is a flowchart of another measurement method according to an embodiment of the present application. This embodiment is applied to a first communication node. As shown in FIG. 2, this embodiment includes S210.

In S210, uplink data carrying strongest neighbor cell information of the first communication node is sent to a second communication node.

In an embodiment, the first communication node may report neighbor cell information to the second communication node so that the second communication node determines a position of the first communication node according to the neighbor cell information. To prevent the first communication node from measuring all neighbor cells near the current serving cell, when the first communication node reports the neighbor cell information to the second communication node, the reported uplink data carries the strongest neighbor cell information so that the second communication node performs configuration according to the strongest neighbor cell information to obtain neighbor cell measurement configuration information, and then the neighbor cell measurement configuration information is sent to the first communication node so that the first communication node measures the strongest neighbor cell according to the neighbor cell measurement configuration information, thereby saving the power consumption of the first communication node and improving the effectiveness of the measurement.

In an embodiment, the uplink data carrying the strongest neighbor cell information of the first communication node may be an RRC message or an MAC CE message.

In an embodiment, the measurement method applied to the first communication node further includes: receiving strongest neighbor cell enable indication information sent by the second communication node, where the strongest neighbor cell enable indication information is configured for indicating whether the first communication node supports reporting a strongest neighbor cell under a preset frequency. In an embodiment, before the first communication node sends the uplink data carrying the strongest neighbor cell information of the first communication node to the second communication node, to enable the first communication node to have a capability of reporting the strongest neighbor cell information, the second communication node enables the first communication node whether to report the strongest neighbor cell information through a system message. That is, the second communication node may send the strongest neighbor cell enable indication information to the first communication node, so as to enable the first communication node to report the strongest neighbor cell information.

In an embodiment, the uplink data carrying the strongest neighbor cell information of the first communication node includes: a Radio Resource Control (RRC) message initiated in an idle state or an inactive state, and a Media Access Control-Control Element (MAC CE) message.

In an embodiment, a method of the RRC message carrying the strongest neighbor cell information includes one of: the RRC message carrying one list including a frequency index and a cell identifier corresponding to the strongest neighbor cell; the RRC message carrying the frequency index and the cell identifier corresponding to the strongest neighbor cell; the RRC message carrying a list of cell identifiers of sequentially corresponding strongest neighbor cells in an order of frequencies or an order of frequency indices; or the RRC message carrying a cell identifier of an intra-frequency strongest neighbor cell.

In an embodiment, a method of the MAC CE message carrying the strongest neighbor cell information includes one of: the MAC CE message carrying one list including a frequency index and a cell identifier corresponding to the strongest neighbor cell; the MAC CE message carrying the frequency index and the cell identifier corresponding to the strongest neighbor cell; the MAC CE message carrying a list of cell identifiers of sequentially corresponding strongest neighbor cells in an order of frequencies or an order of frequency indices; or the MAC CE message carrying a cell identifier of an intra-frequency strongest neighbor cell.

In an embodiment, a strongest neighbor cell includes one of: a neighbor cell with a largest measurement value of Reference Signal Receiving Power (RSRP) or Reference Signal Receiving Quality (RSRQ) or a Signal to Interference plus Noise Ratio (SINR); or a neighbor cell with the RSRP or RSRQ or SINR being greater than or equal to an eighteenth preset threshold and the largest measurement value of the RSRP or RSRQ or SINR. The neighbor cell may be the strongest neighbor cell of the intra-frequency, a certain frequency or all frequencies.

In an embodiment, the strongest neighbor cell information includes one of: a frequency, a frequency index, a cell identifier of a neighbor cell, or a signal quality value.

Figure 3:
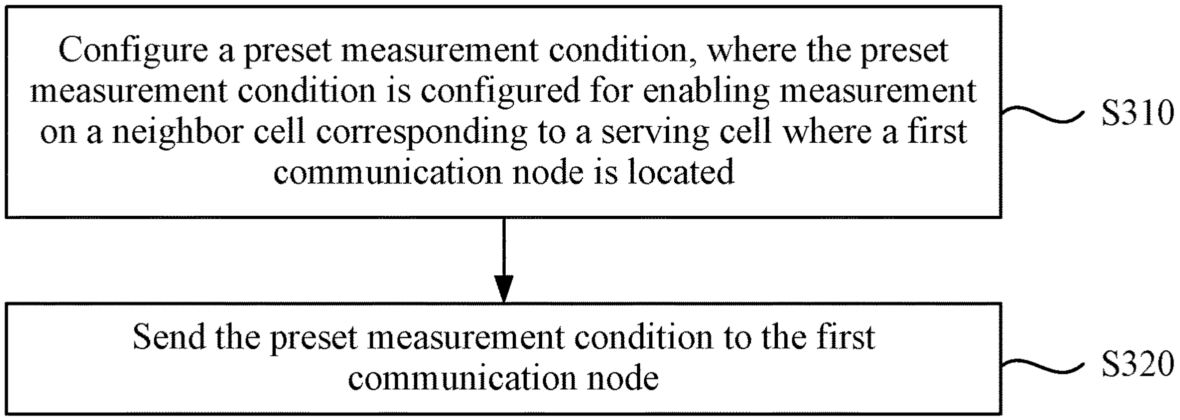
FIG. 3 is a flowchart of another measurement method according to an embodiment of the present application.

In an embodiment, FIG. 3 is a flowchart of another measurement method according to an embodiment of the present application. This embodiment is applied to a second communication node. Exemplarily, the second communication node may be a base station or a network side. As shown in FIG. 3, this embodiment includes S310 and S320.

In S310, a preset measurement condition is configured, where the preset measurement condition is configured for enabling measurement on a neighbor cell corresponding to a serving cell where a first communication node is located.

In S320, the preset measurement condition is sent to the first communication node.

In an embodiment, the second communication node configures the preset measurement condition.

In such way, according to the preset measurement condition, the first communication node enables the measurement on the neighbor cell corresponding to the serving cell where the first communication node is located, rather than measuring all neighbor cells, thereby saving the power consumption of the first communication node and reducing the interruption time of an RRC re-establishment process.

In an embodiment, the preset measurement condition includes one of: satisfying a trigger condition for enabling intra-frequency measurement or inter-frequency measurement; validity of a measurement value; measurement configuration information; or neighbor cell time-frequency information.

In an embodiment, a trigger condition for the validity of the measurement value refers to that in the case where measurement values of intra-frequency, inter-frequency, a frequency or the neighbor cell satisfy a preset condition, measurement does not need to be performed on the intra-frequency, the inter-frequency, the frequency or the neighbor cell. That is, in the case where the first communication node satisfies the trigger condition for enabling the intra-frequency measurement or the inter-frequency measurement, the first communication node may continue to perform the intra-frequency measurement and the inter-frequency measurement, thereby repeatedly triggering the measurement on the neighbor cell, resulting in the increase of the power consumption of the first communication node. For this reason, in the case where the trigger condition for enabling the intra-frequency measurement or the inter-frequency measurement is satisfied, the measurement time or measurement times are limited. That is, in the case where the neighbor cell measurement time or neighbor cell measurement times do not satisfy the preset condition, the measurement on the neighbor cell does not need to be enabled, thereby reducing the power consumption of the first communication node.

In an embodiment, in the case where the trigger condition for enabling the intra-frequency measurement or the inter-frequency measurement is that a signal quality of the serving cell where the first communication node is located deteriorates, a method for determining the deterioration of the signal quality of the serving cell where the first communication node is located includes at least one of: within a first preset time, the signal quality of the serving cell being less than or equal to a first preset threshold; within a second preset time, a downlink radio link quality of the serving cell being less than or equal to a second preset threshold; RRC receiving an out of sync indication reported by a physical layer; within a third preset time, a number of out of sync indications reported by the physical layer and received by the RRC being greater than or equal to a third preset threshold; a number of out of sync indications reported by the physical layer and continuously received by the RRC being greater than or equal to a fourth preset threshold; with a fourth preset time, a number of undetected PDCCHs being greater than or equal to a fifth preset threshold; a number of continuously undetected PDCCHs being greater than or equal to a sixth preset threshold; a maximum number of repetitions of an NPDCCH being greater than or equal to a seventh preset threshold; a maximum number of repetitions of an NPDSCH being greater than or equal to an eighth preset threshold; a retransmission rate of an HARQ being greater than or equal to a ninth preset threshold; within a fifth preset time, a signal quality variation value of the serving cell being greater than or equal to a tenth preset threshold; a signal quality of an intra-frequency neighbor cell being less than or equal to an eleventh preset threshold and the inter-frequency measurement is enabled; or a duration of enabling the intra-frequency measurement or the inter-frequency measurement being greater than or equal to a twelfth preset threshold.

In an embodiment, the signal quality of the serving cell or the neighbor cell is represented by at least one of parameters: an RSRP value, an RSRQ value, or an SINR value.

In an embodiment, the downlink radio link quality of the serving cell is represented by at least one of parameters: an RSRP value, or a BLER value.

In an embodiment, a condition for determining the validity of the measurement value includes at least one of: a measurement end duration reaching a thirteenth preset threshold; a duration of enabling search or measurement reaching a fourteenth preset threshold; a signal quality variation value of the serving cell reaching a fifteenth preset threshold; or current measurement times of the intra-frequency or the inter-frequency being less than or equal to a sixteenth preset threshold.

In an embodiment, the measurement method applied to the second communication node further includes: receiving uplink data carrying a neighbor cell measurement state indication reported by the first communication node, where the neighbor cell measurement state indication includes at least one of: an indication of satisfying the intra-frequency measurement or the inter-frequency measurement; an indication of about to enable the intra-frequency measurement or the inter-frequency measurement; or an indication of a request for enabling the intra-frequency measurement or the inter-frequency measurement.

In an embodiment, the uplink data carrying the neighbor cell measurement state indication includes one of: a random access preamble, a PUCCH message, an MAC CE message, or an RRC message.

In an embodiment, after the uplink data carrying the neighbor cell measurement state indication reported by the first communication node is received, the method further includes: configuring an enabling occasion of the inter-frequency measurement is configured. Where a method for determining the enabling occasion includes one of: using a first preset occasion after the uplink data is successfully sent as the enabling occasion; using an occasion of successfully receiving feedback information of the second communication node as the enabling occasion; or using a second preset occasion carried in the uplink data as the enabling occasion.

In an embodiment, the measurement method applied to the second communication node further includes: configuring an inter-frequency measurement occasion, where the inter-frequency measurement occasion includes: an occasion when the first communication node does not transmit data to the second communication node, or an occasion when the first communication node does not receive data from the second communication node.

In an embodiment, a method for determining the inter-frequency measurement occasion includes one of: within a sixth preset time, the MAC not receiving or sending an MAC SDU message; within a seventh preset time, a buffer of RLC or MAC is empty; or a service delay being greater than or equal to a seventeenth preset threshold.

In an embodiment, the measurement configuration information includes one of: first measurement configuration information carried in an RRC message; second measurement configuration information carried in the RRC message; measurement configuration information activated by an MAC CE message; or measurement configuration information activated by a DCI message.

In an embodiment, the first measurement configuration information includes a measurement frequency value and a cell selection parameter under each frequency; and the second measurement configuration information includes a measurement frequency index.

In an embodiment, the measurement configuration information activated by the MAC CE message includes one of: an activation measurement identification bit carried in the MAC CE message; an activation measurement frequency index carried in the MAC CE message; or a bit string carried in the MAC CE message. Where the activation measurement identification bit is configured for indicating whether the intra-frequency measurement and/or the inter-frequency measurement is activated; and the bit string is configured for indicating that whether measurement on a certain frequency represented by a bit is enabled.

In an embodiment, the measurement configuration information activated by the DCI message includes one of: an activation measurement identification bit carried in the DCI message; an activation measurement frequency index carried in the DCI message; or a bit string carried in the DCI message. Where the activation measurement identification bit is configured for indicating the intra-frequency measurement or the inter-frequency measurement is activated; and the bit string is configured for indicating that whether measurement on a certain frequency represented by a bit is enabled.

In an embodiment, the neighbor cell time-frequency information is time-frequency information of an intra-frequency or inter-frequency neighbor cell broadcasted by system information or configured by an RRC message.

In an embodiment, the neighbor cell time-frequency information includes a time domain position of a measurement occasion or a transmission occasion of a measurement signal; and a frequency domain position of a measurement frequency, a measurement bandwidth or the measurement signal.

In an embodiment, a measurement method applied to a second communication node includes: receiving uplink data carrying strongest neighbor cell information of a first communication node sent by the first communication node.

In an embodiment, the measurement method applied to the second communication node further includes: sending strongest neighbor cell enable indication information to the first communication node, where the strongest neighbor cell enable indication information is configured for indicating whether the first communication node supports reporting a strongest neighbor cell under a preset frequency.

In an embodiment, the uplink data carrying the strongest neighbor cell information of the first communication node includes an RRC message initiated in an idle state or an inactive state; and an MAC CE message.

In an embodiment, a method of the RRC message carrying the strongest neighbor cell information includes one of: the RRC message carrying one list including a frequency index and a cell identifier corresponding to the strongest neighbor cell; the RRC message carrying the frequency index and the cell identifier corresponding to the strongest neighbor cell; the RRC message carrying a list of cell identifiers of sequentially corresponding strongest neighbor cells in an order of frequencies or an order of frequency indices; or the RRC message carrying a cell identifier of an intra-frequency strongest neighbor cell.

In an embodiment, a method of the MAC CE message carrying the strongest neighbor cell information includes one of: the MAC CE message carrying one list including a frequency index and a cell identifier corresponding to the strongest neighbor cell; the MAC CE message carrying the frequency index and the cell identifier corresponding to the strongest neighbor cell; the MAC CE message carrying a list of cell identifiers of sequentially corresponding strongest neighbor cells in an order of frequencies or an order of frequency indices; or the MAC CE message carrying a cell identifier of an intra-frequency strongest neighbor cell.

In an embodiment, a strongest neighbor cell includes one of: a neighbor cell with a largest measurement value of RSRP or RSRQ or an SINR; or a neighbor cell with the RSRP or RSRQ or SINR greater than or equal to an eighteenth preset threshold and the largest measurement value of the RSRP or RSRQ or SINR.

In an embodiment, the strongest neighbor cell information includes one of: a frequency, a frequency index, a cell identifier of a neighbor cell, or a signal quality value.

In an implementation manner, the case where the preset measurement condition is that the trigger condition for enabling the intra-frequency measurement and/or the inter-frequency measurement is satisfied is used as an example, so as to describe a process of enabling the measurement on the neighbor cell corresponding to the serving cell where the first communication node is located.

In an embodiment, the second communication node enables the first communication node whether to determine the trigger condition for the intra-frequency measurement and/or the inter-frequency measurement. In the case where the second communication node enables the first communication node to determine the trigger condition for the intra-frequency measurement and/or the inter-frequency measurement, the first communication node may make determination according to configuration information, and in the case where the trigger condition for the intra-frequency measurement and/or the inter-frequency measurement is satisfied, the first communication node enables the intra-frequency measurement and/or the inter-frequency measurement.

In an embodiment, the trigger condition for the intra-frequency measurement and/or the inter-frequency measurement may be that the signal quality of the serving cell where the first communication node is located deteriorates. In an embodiment, trigger conditions for the intra-frequency measurement and the inter-frequency measurement may be the same trigger condition or may be different trigger conditions. Exemplarily, the trigger conditions for the intra-frequency measurement and the inter-frequency measurement are the same trigger condition, and then in the case where the same trigger condition is satisfied, the intra-frequency measurement and the inter-frequency measurement are triggered; or the trigger conditions for the intra-frequency measurement and the inter-frequency measurement are different trigger conditions, for example, the trigger condition for the intra-frequency measurement is relatively low and the trigger condition for the inter-frequency measurement is relatively high, which is not limited and may be adjusted according to the actual situation.

The second communication node broadcasts or configures intra-frequency and/or inter-frequency frequencies and neighbor cells existing on the frequencies. In the connection state, the first communication node performs measurement on the neighbor cell in the case where the trigger condition is satisfied. The second communication node configures intra-frequency configuration of the same frequency as the serving cell where the first communication node is currently located through the broadcasted system information or RRC message, where a cell identifier (for example, a Physical Cell Identifier (PCI)) of a neighbor cell existing on the intra-frequency may be included, and the second communication node configures inter-frequency configuration of a different frequency from the current serving cell, where an inter-frequency frequency and a cell identifier (for example, the PCT) of a neighbor cell existing on the frequency may be included.

The second communication node may, according to the position of the first communication node, select or enable whether to enable the first communication node to determine the trigger condition for the intra-frequency measurement and the inter-frequency measurement. The second communication node configures, through the RRC message, the trigger condition for the intra-frequency measurement and the inter-frequency measurement, such as a threshold, time and the like, to the first communication node. For example, an RRC reconfiguration message, an RRC establishment message, an RRC re-establishment message or an RRC continuation message carries a threshold or a timer value for determining the trigger condition for the intra-frequency measurement or the inter-frequency measurement. After receiving a message, the first communication node finds that the message carries configuration parameters for determining the trigger condition for the intra-frequency and the inter-frequency, such as the threshold and the timer value, and determines the trigger condition for the intra-frequency or the inter-frequency; otherwise, the trigger condition for the intra-frequency or the inter-frequency is not determined.

In an embodiment, the trigger condition for the intra-frequency measurement and the inter-frequency measurement may be whether the signal quality of the serving cell deteriorates. In the case where the signal quality of the serving cell where the first communication node is located deteriorates, the measurement on the neighbor cell is enabled.

In an embodiment, a method for the first communication node to determine the deterioration of the signal quality of the serving cell may include one of the following.

Method one: within a first preset time, the signal quality of the serving cell is less than or equal to a first preset threshold. The signal quality of the serving cell may be represented by parameters such as an RSRP value, an RSRQ value, and an SINR value and other measurement results of the serving cell. Exemplarily, within period 1, the RSRP value of the serving cell being less than or equal to threshold 1; and/or within period 2, the RSRQ value of the serving cell being less than or equal to threshold 2; and/or within period 3, the SINR value of the serving cell being less than or equal to threshold 3, and the first communication node considers that the signal quality of this cell is relatively poor and the intra-frequency measurement is enabled. Within period 4, the RSRP value of the serving cell being less than or equal to threshold 4; and/or within period 5, the RSRQ value of the serving cell being less than or equal to threshold 5; and/or within period 6, the SINR value of the serving cell being less than or equal to threshold 6, and the first communication node considers that the signal quality of this cell is relatively poor and the inter-frequency measurement is enabled. For example, at occasion n, the RSRP value of the serving cell is obtained, timer 1 is enabled, and a duration of timer 1 is equal to period 1. When timer 1 expires and the RSRP value of the serving cell being less than or equal to threshold 1 during this period, the first communication node enables the intra-frequency measurement. Similarly, for the RSRQ value and the SINR value, the process of enabling the inter-frequency is also the same, which is not repeated here.

In an embodiment, the second communication node may configure a threshold and a value for a certain time. Threshold 1 and threshold 4 may be the same or different, threshold 2 and threshold 5 may be the same or different, and threshold 3 and threshold 6 may be the same or different. Period 1, period 2, period 3, period 4, period 5, and period 6 may be the same or different.

Method two: within a second preset time, a downlink radio link quality of the serving cell is less than or equal to a second preset threshold. The downlink radio link quality may be embodied as the RSRP measured by the first communication node or the BLER obtained by the first communication node. That is, in the case where the RSRP measured by the first communication node is less than or equal to threshold 1 within period 1 or the BLER obtained by the first communication node is less than or equal to threshold 2, the first communication node considers that the signal quality of this cell is relatively poor and the intra-frequency measurement is enabled. In the case where the RSRP measured by the first communication node is less than or equal to threshold 3 within period 2 or the BLER obtained by the first communication node is less than or equal to threshold 4, the first communication node considers that the signal quality of this cell is relatively poor and the inter-frequency measurement is enabled.

In an embodiment, the second communication node may configure a threshold and a value for a certain time. Threshold 1 and threshold 3 may be the same or different, and threshold 2 and threshold 4 may be the same or different. Period 1 and period 2 may be the same or different.

Method three: the RRC receives an out of sync indication reported by a physical layer. In the case where the downlink radio link quality of the serving cell is less than or equal to a certain threshold within an evaluation period, the physical layer reports the out of sync indication to the RRC. In the case where the RRC receives the out of sync indication, the first communication node enables the intra-frequency measurement and/or the inter-frequency measurement.

Alternatively, within a third preset time, a number of out of sync indications reported by the physical layer and received by the RRC is greater than or equal to a third preset threshold. Within period 1, the number of out of sync indications received by the RRC is greater than or equal to threshold 1, and the first communication node enables the intra-frequency measurement. Within period 2, the number of out of sync indications received by the RRC is greater than or equal to threshold 2, and the first communication node enables the inter-frequency measurement. For example, the RRC receives one out of sync indication and timer 1 expires, timer 1 is enabled and starts to count the number of received out of sync indications, and the duration of timer 1 is equal to a certain period 1. When the RRC receives one out of sync indication and the timer does not expire, the number of received out of sync indications is incremented by one. Before the timer expires, if the number of out of sync indications received by the RRC is greater than or equal to threshold 1, the first communication node enables the intra-frequency measurement. The same goes for the inter-frequency.

In an embodiment, the second communication node may configure a threshold and a value for a certain time. Period 1 and period 2 may be the same or different. Threshold 1 and threshold 2 may be the same or different.

Alternatively, a number of out of sync indications reported by the physical layer and continuously received by the RRC is greater than or equal to a fourth preset threshold. The number of out of sync indications continuously received by the RRC is greater than or equal to threshold 1, and the first communication node enables the intra-frequency measurement. The number of out of sync indications continuously received by the RRC is greater than or equal to threshold 2, and the first communication node enables the inter-frequency measurement. For example, the RRC receives one out of sync indication and a counter is 0, and the counter starts to count the number of continuously received out of sync indications. If out of sync indications are continuously received, the counter is incremented by one, and if no out of sync indication is received or a synchronization indication is received, the counter is cleared. The number of out of sync indications continuously received by the RRC is greater than or equal to threshold 1, and the first communication node enables the intra-frequency measurement. The same goes for the inter-frequency.

In an embodiment, the second communication node may configure a threshold. Threshold 1 and threshold 2 may be the same or different.

Method four: within a fourth preset time, a number of PDCCHs undetected by the first communication node is greater than or equal to a fifth preset threshold. Within period 1, the number of PDCCHs undetected by the first communication node reaches a certain threshold 1, and the first communication node enables the intra-frequency measurement. Within period 2, the number of PDCCHs undetected by the first communication node reaches a certain threshold 2, and the first communication node enables the inter-frequency measurement. For example, the first communication node does not detect one PDCCH and timer 1 expires, timer 1 is enabled, the number of undetected PDCCHs is started to be counted, and the duration of timer 1 is equal to period 1. The first communication node does not detect one PDCCH and the timer does not expire, and the number of undetected PDCCHs increases by one. If the number of undetected PDCCHs is greater than or equal to threshold 1, the first communication node enables the intra-frequency measurement. The same goes for the inter-frequency.

Alternatively, a number of continuously undetected PDCCHs is greater than or equal to a sixth preset threshold. The number of continuously undetected PDCCHs is greater than or equal to threshold 1, and the first communication node enables the intra-frequency measurement. The number of continuously undetected PDCCHs is greater than or equal to threshold 2, and the first communication node enables the inter-frequency measurement. For example, if one PDCCH is not detected and the counter is 0, the counter starts to count the number of continuously undetected PDCCHs. If the PDCCH is not detected continuously, the counter is incremented by one, and if the PDCCH is detected, the counter is cleared. The number of continuously undetected PDCCHs is greater than or equal to threshold 1, and the first communication node enables the intra-frequency measurement. The same goes for the inter-frequency.

In an embodiment, the second communication node may configure a threshold and a value for a certain time. Threshold 1 and threshold 2 may be the same or different.

Method five: a maximum number of repetitions of an NPDCCH is greater than or equal to a seventh preset threshold or a maximum number of repetitions of an NPDSCH is greater than or equal to an eighth preset threshold. The maximum number of repetitions of the NPDCCH configured by the second communication node through the RRC is greater than or equal to a certain threshold 1, and the first communication node enables the intra-frequency measurement. The maximum number of repetitions of the NPDCCH configured by the node through the RRC is greater than or equal to a certain threshold 2, and the first communication node enables the inter-frequency measurement.

Moreover/alternatively, the maximum number of repetitions of the NPDSCH configured by the second communication node through the RRC is greater than or equal to a certain threshold 3, and the first communication node enables the intra-frequency measurement. The maximum number of repetitions of the NPDSCH configured by the second communication node through the RRC is greater than or equal to a certain threshold 4, and the first communication node enables the inter-frequency measurement.

In an embodiment, the second communication node may configure a threshold. Threshold 1, threshold 3, threshold 2, and threshold 4 may be the same or different.

Alternatively, the maximum number of repetitions of the NPDCCH configured by the second communication node through the RRC and the maximum number of repetitions of the NPDCCH indicated by the second communication node through the DCI are greater than or equal to a certain threshold 1, and the first communication node enables the intra-frequency measurement. The maximum number of repetitions of the NPDCCH configured by the second communication node through the RRC and the maximum number of repetitions of the NPDCCH indicated by the second communication node through the DCI are greater than or equal to a certain threshold 2, and the first communication node enables the inter-frequency measurement.

Moreover/alternatively, the maximum number of repetitions of the NPDSCH configured by the second communication node through the RRC and the maximum number of repetitions of the NPDSCH indicated by the second communication node through the DCI are greater than or equal to a certain threshold 3, and the first communication node enables the intra-frequency measurement. The maximum number of repetitions of the NPDSCH configured by the second communication node through the RRC and the maximum number of repetitions of the NPDSCH indicated by the second communication node through the DCI are greater than or equal to a certain threshold 4, and the first communication node enables the inter-frequency measurement.

In an embodiment, the second communication node may configure a threshold. Threshold 1, threshold 3, threshold 2, and threshold 4 may be the same or different.

Method six: a retransmission rate of an HARQ is greater than or equal to a ninth preset threshold. Exemplarily, the retransmission rate of the HARQ is greater than or equal to a certain threshold 1, and the first communication node enables the intra-frequency measurement. The retransmission rate of the HARQ is greater than or equal to a certain threshold 2, and the first communication node enables the inter-frequency measurement.

In an embodiment, the second communication node may configure a threshold. Threshold 1 and threshold 2 may be the same or different.

Method seven: within a fifth preset time, a serving signal quality change value of the serving cell is greater than or equal to a tenth preset threshold. The serving signal quality change of the serving cell is great, and it is determined that the first communication node is at the edge and moves fast, and may move to other cells. The signal quality of the serving cell may be acquired through measurement results of the serving cell, such as the RSRP value, the RSRQ value, and the SINR value. That is, in the case where within a certain period 1, an RSRP reduction of the serving cell is greater than or equal to a certain threshold 1; and/or within a certain period 2, an RSRQ reduction of the serving cell is greater than or equal to a certain threshold 2; and/or within a certain period 3, an SINR reduction of the serving cell is greater than or equal to a certain threshold 3, the first communication node considers that the signal quality of this cell is relatively poor and the intra-frequency measurement is enabled. In the case where within a certain period 4, the RSRP reduction of the serving cell is greater than or equal to a certain threshold 4; and/or within a certain period 5, the RSRQ reduction of the serving cell is greater than or equal to a certain threshold 5; and/or within a certain period 6, the SINR reduction of the serving cell is greater than or equal to a certain threshold 6, the first communication node considers that the signal quality of this cell is relatively poor and the inter-frequency measurement is enabled. For example, at occasion n, the RSRP value of the serving cell is obtained, timer 1 is enabled, and the duration of timer 1 is equal to a certain period 1. When timer 1 expires and the RSRP reduction of the serving cell is greater than or equal to a certain threshold 1 during this period, the first communication node enables the intra-frequency measurement. For the RSRQ and the SINR, the same goes for the inter-frequency, which is not repeated here.

In an embodiment, the second communication node may configure a threshold and a value for a certain time. Threshold 1 and threshold 4 may be the same or different, threshold 2 and threshold 5 may be the same or different, and threshold 3 and threshold 6 may be the same or different. A certain period 1, a certain period 2, a certain period 3, a certain period 4, a certain period 5, and a certain period 6 may be the same or different.

Method eight: after the intra-frequency measurement is enabled, in the case where a signal quality of an intra-frequency neighbor cell is less than or equal to an eleventh preset threshold, the inter-frequency measurement is enabled. That is, the inter-frequency measurement is enabled only in the case where the signal quality of the intra-frequency neighbor cell is not good enough. That is, after the first communication node starts the intra-frequency measurement and measures the intra-frequency neighbor cell, if the measured RSRP or RSRQ or SINR of the intra-frequency neighbor cell with the best signal quality is less than or equal to the eleventh threshold, the first communication node enables the inter-frequency measurement. Alternatively, the signal quality RSRP or RSRQ or SINR of this cell is less than or equal to a certain threshold, the RSRP or RSRQ or SINR of the intra-frequency neighbor cell with the best signal quality is less than or equal to the eleventh threshold, and the first communication node enables the inter-frequency measurement. For example, the first communication node enables the intra-frequency measurement, and in the case where the RSRP of the best cell among intra-frequency cells is less than or equal to the eleventh threshold, the first communication node enables the inter-frequency measurement again.

Method nine: a duration of enabling the intra-frequency measurement or the inter-frequency measurement is greater than or equal to a twelfth preset threshold, that is, in the case where the timer expires, the intra-frequency measurement or the inter-frequency measurement is enabled again. That is, after the intra-frequency measurement is enabled, the first communication node enables timer 1 at the same time, and in the case where the timer expires, the first communication node enables the intra-frequency measurement again and enables timer 1 again at the same time.

After the inter-frequency measurement is enabled, the first communication node enables timer 2 at the same time, and in the case where the timer expires, the first communication node enables the inter-frequency measurement again and enables timer 2 again at the same time. For example, after enabling the intra-frequency measurement, the first communication node enables timer 1, and in the case where timer 1 is enabled, the first communication node enables the intra-frequency measurement again.

Method ten is any combination of methods one to nine. For example, method ten is a combination of methods one and seven, that is, the RSRP of the serving cell is less than or equal to a certain threshold 1 and within a certain period 1 and the RSRP reduction of the serving cell is greater than or equal to a certain threshold 2, then the first communication node enables the intra-frequency measurement. Within a certain period 2, the RSRP reduction of the serving cell is greater than or equal to a certain threshold 3, and the first communication node enables the inter-frequency measurement.

For example, method ten is a combination of methods five and seven, that is, the maximum number of repetitions of the NPDCCH configured by the second communication node through the RRC is greater than or equal to a certain threshold 1 and in the case where within a certain period 1, the RSRP reduction of the serving cell is greater than or equal to a certain threshold 2, then the first communication node enables the intra-frequency measurement. Within a certain period 2, the RSRP reduction of the serving cell is greater than or equal to a certain threshold 3, and the first communication node enables the inter-frequency measurement.

For example, method ten is a combination of methods one and three, that is, the RSRP of the serving cell is less than or equal to a certain threshold 1 and within a certain period 1, the number of out of sync indications received by the RRC is greater than or equal to a certain threshold 2, then the first communication node enables the intra-frequency measurement. Within a certain period 2, the number of out of sync indications received by the RRC is greater than or equal to threshold 3, and the first communication node enables the inter-frequency measurement.

For example, method ten is a combination of methods one and nine, that is, the RSRP of the serving cell is less than or equal to a certain threshold 1 and timer 1 expires, then the first communication node enables the intra-frequency measurement. The RSRP of the serving cell is less than or equal to a certain threshold 2 and timer 2 expires, then the first communication node enables the inter-frequency measurement.

In an implementation manner, the validity of the measurement value refers to that the measurement value is valid in the case where the measurement value does not satisfy the condition, and the measurement on the intra-frequency or the inter-frequency or a certain frequency or cell may no longer be enabled; otherwise, the measurement value is invalid, and the measurement on the intra-frequency or the inter-frequency or a certain frequency or cell needs to be enabled. The first communication node satisfies the trigger condition for the intra-frequency or the inter-frequency measurement again. As described in the preceding embodiments of methods one to ten, if the measurement on the intra-frequency or the inter-frequency and a certain frequency or neighbor cell satisfies a constraint, the first communication node no longer performs measurement on the intra-frequency or the inter-frequency and a certain frequency or neighbor cell; otherwise, if the constraint is not satisfied, the first communication node triggers the measurement on the intra-frequency or the inter-frequency and a certain frequency or neighbor cell.

A case where the first communication node enables the intra-frequency measurement or the inter-frequency measurement and obtains a measurement result of a certain neighbor cell, but a radio link failure is not triggered is described below. If the first communication node reaches the trigger condition for the intra-frequency measurement and the inter-frequency measurement again, as described in the preceding embodiments of methods one to ten, the first communication node continues to perform the intra-frequency measurement and the inter-frequency measurement, especially if the first communication node is always at the edge of the cell, the measurement on the cell is repeatedly triggered, thereby increasing the power consumption of the first communication node. A case where the first communication node enables the intra-frequency measurement or the inter-frequency measurement, searches for a certain bin, and obtains measurement results of all neighbor cells under the bin, but a radio link failure is not triggered is described below. If the first communication node satisfies the trigger condition for the intra-frequency measurement and the inter-frequency measurement again, as described in the preceding embodiments of methods one to ten, the first communication node continues to perform the intra-frequency measurement and the inter-frequency measurement, thereby increasing the power consumption of the first communication node.

In order not to increase the power consumption of the first communication node, the measurement time or measurement times may be limited, and if a constraint is satisfied, it is determined that the measurement on the cell or the frequency is not performed any more. In an embodiment, the case where the preset measurement condition is the validity of the measurement value is used as an example for the description of a process of enabling the neighbor cell measurement.

In an embodiment, a condition for determining the validity of the measurement value includes one of: in mode one, a measurement end duration reaches a thirteenth preset threshold. In an embodiment, for the measurement on the intra-frequency or the inter-frequency, all cells under a certain frequency, or a certain neighbor cell, it is determined that no further measurement is required within a certain period of time, otherwise the measurement may be performed. For example, if a measurement result of a certain cell or a neighbor cell under a certain frequency is within a certain period of time, the measurement result is determined to be valid. That is, after the measurement on a certain cell starts or the measurement result is generated, the timer is enabled. If the timer does not expire, the measurement result is determined to be valid, and the cell does not need to be measured again; and if the timer expires, the measurement result is determined to be invalid, and the cell needs to be measured again.

Alternatively, a duration of enabling search or measurement reaches a fourteenth preset threshold. In an embodiment, in the case where the search or measurement is enabled at a certain frequency, the timer is enabled. If the timer does not expire, the cell searched under this frequency and the cell measurement result are determined to be valid, and the frequency is no longer searched. If the timer expires, the cell searched under this frequency and the cell measurement result are determined to be invalid, and measurement needs to be performed again. Alternatively, for cells searched at a certain frequency, after measurement results of these cells are obtained, the timer is enabled. If the timer does not expire, the cells searched under this frequency and the measurement results of the cells are determined to be valid, and the frequency does not need to be searched again; if the timer expires, the cells searched under this frequency and the measurement results of the cells are determined to be invalid, and measurement needs to be performed again.

Alternatively, the intra-frequency measurement or the inter-frequency measurement is enabled, and within a certain period of time, it is determined that the intra-frequency measurement or the inter-frequency measurement does not need to be enabled again. That is, in the case where the first communication node enables the intra-frequency measurement or the inter-frequency measurement, the timer is enabled. If the timer does not expire, it is determined that the intra-frequency measurement or the inter-frequency measurement cannot be enabled; if it is greater than or equal to a certain time, it is determined that the measurement result is invalid and needs to be measured again.

The timer duration and the threshold may be configured by the second communication node through an RRC message or a system message.

Mode two: a signal quality variation value of the serving cell reaches a fifteenth preset threshold. In an embodiment, within a certain period of time, the signal quality change of the serving cell is greater than or equal to a certain threshold, and it is determined that the serving cell may be measured again; otherwise, measurement is not required. Within a certain period of time, the increase or decrease of the signal quality (such as the RSRP, RSRQ, or SINR) of the serving cell is greater than or equal to a certain threshold, and it is determined that the UE moves faster, that is, the neighbor cell may have changed, and in the case where a condition for the intra-frequency measurement and the inter-frequency measurement is satisfied again, the intra-frequency measurement and the inter-frequency measurement are triggered; otherwise, the intra-frequency measurement and the inter-frequency measurement are not triggered.

In an embodiment, the timer duration and the threshold may be configured by the node through an RRC message or a system message.

Mode three: current measurement times of the intra-frequency or the inter-frequency are less than or equal to a sixteenth preset threshold, that is, maximum intra-frequency or inter-frequency measurement times. That is, if the trigger condition for the intra-frequency is satisfied and intra-frequency measurement times are less than or equal to maximum measurement times 1, the intra-frequency measurement is enabled, otherwise, the intra-frequency measurement is not enabled; if the trigger condition for the inter-frequency is satisfied and inter-frequency measurement times are less than or equal to maximum measurement times 2, the intra-frequency measurement is enabled, otherwise, the intra-frequency measurement is not enabled. The maximum measurement times may be greater than or equal to 1, may be a fixed value, or may be configured by the node. The maximum measurement times 1 and the maximum measurement times 2 may be the same or different.

Mode four is a combination of modes one to three. For example: mode four is a combination of modes one and two. That is, in the case where the first communication node performs the intra-frequency measurement, timer 1 is enabled. The first communication node satisfies the trigger condition for the intra-frequency measurement, timer 1 does not expire, and within a certain period of time, the RSRP reduction of the serving cell being greater than or equal to a certain threshold, then the first communication node enables the intra-frequency measurement. In the case where the first communication node performs the intra-frequency measurement, timer 2 is enabled. The first communication node satisfies the trigger condition for the inter-frequency measurement, timer 2 does not expire, and within a certain period of time, the RSRP reduction of the serving cell being greater than or equal to a certain threshold, then the first communication node enables the inter-frequency measurement.

In an implementation manner, the measurement method applied to the first communication node further includes reporting uplink data carrying a neighbor cell measurement state indication to the second communication node. That is, in the case where the first communication node satisfies an inter-frequency measurement condition, the first communication node sends an uplink signal or a message to inform the second communication node.

Figures 4, 5, 6:
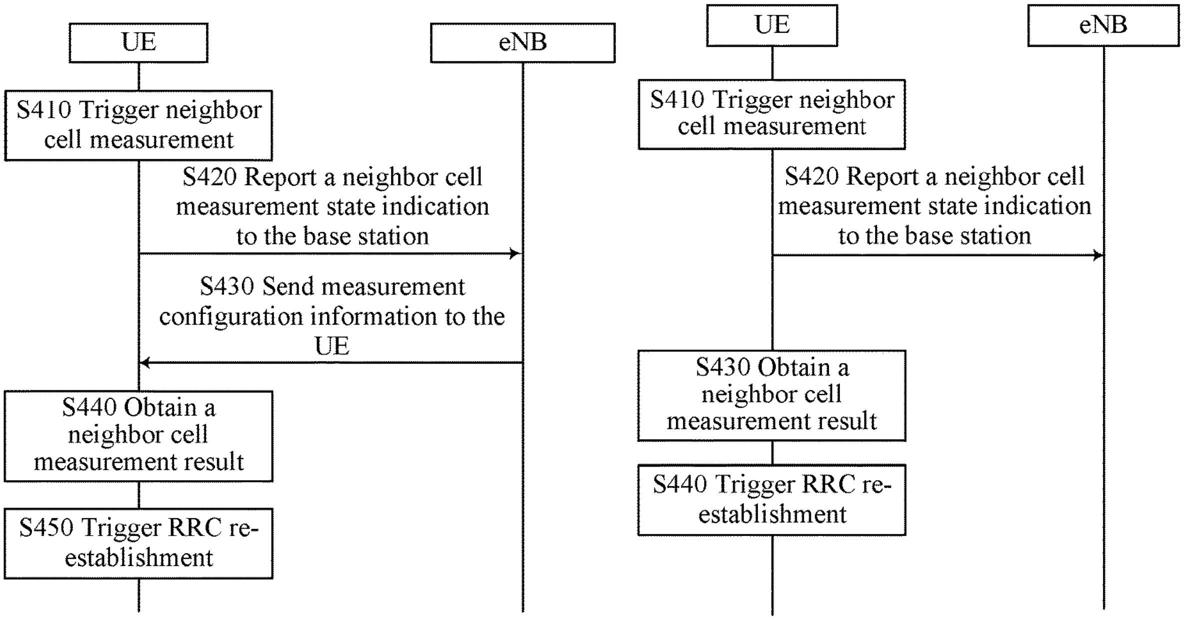
FIG. 4 is a flowchart of transmission of measurement configuration information according to an embodiment of the present application.
FIG. 5 is a diagram showing a format of a Media Access Control-Control Element (MAC CE) message according to an embodiment of the present application.
FIG. 6 is a diagram showing a format of another MAC CE message according to an embodiment of the present application.

In the case where the first communication node satisfies the inter-frequency measurement condition, the first communication node may inform the second communication node by sending an uplink signal or a message. The second communication node knows a behavior of the first communication node, and in the case where the first communication node performs the inter-frequency measurement, the second communication node may be avoided from scheduling the first communication node. Optionally, the second communication node configures measurement configuration information for the first communication node, including frequencies to be measured, neighbor cells, and the like. FIG. 4 is a flowchart of transmission of measurement configuration information according to an embodiment of the present application. In this embodiment, the case where the first communication node is a UE and the second communication node is an evolved NodeB (eNB) is used as an example for description of a transmission process of the measurement configuration information. As shown in FIG. 4, this embodiment includes S410 to S450.

In S410, neighbor cell measurement is triggered.

In S420, a neighbor cell measurement state indication is reported to the base station.

In S430, measurement configuration information is sent to the UE.

In S440, a neighbor cell measurement result is obtained.

In S450, RRC re-establishment is triggered.

In an embodiment, as shown in a left figure in FIG. 4, the eNB sends the measurement configuration information to the UE. In an embodiment, as shown in a right figure in FIG. 4, the eNB does not send the measurement configuration information to the UE.

In an embodiment, the neighbor cell measurement state indication may be an indication whether the first communication node satisfies the intra-frequency measurement or the inter-frequency measurement, or an indication that the UE is about to enable the intra-frequency measurement or the inter-frequency measurement, or an indication of a request for enabling the intra-frequency measurement or the inter-frequency measurement, or the like. The first communication node informs the second communication node by sending an uplink signal or an uplink message. In an embodiment, a method of reporting the uplink data of the neighbor cell measurement state indication to the second communication node includes one of the following.

Method one: the first communication node informs the second communication node by sending a preamble. The second communication node configures a dedicated preamble resource through a system message or an RRC message. For example, the second communication node configures a time-frequency resource (including a period, start time, a frequency domain position and the like) of a certain Physical Random Access Channel (PRACH) and in the case where the first communication node satisfies the inter-frequency measurement condition, the first communication node sends the preamble on the resource. The second communication node receives the preamble on the resource and may know that the first communication node satisfies the inter-frequency measurement condition. The second communication node configures the preamble resource (including a range of a preamble sequence number, a starting sequence number, and a number of preambles). In the case where the first communication node satisfies the inter-frequency measurement condition, the first communication node sends the preamble. The second communication node receives the preamble and may know that the first communication node satisfies the inter-frequency measurement condition.

Method two: the first communication node informs the second communication node by sending a PUCCH message. The second communication node configures a dedicated PUCCH resource through a system message or an RRC message. For example, the node configures a certain PUCCH time-frequency resource (including a period, start time, a frequency domain position and the like), and in the case where the first communication node satisfies the inter-frequency measurement condition, the first communication node sends the PUCCH on the resource. The second communication node receives the PUCCH on the resource and may know that the first communication node satisfies the inter-frequency measurement condition. A PUCCH sequence may be 1 bit, such as scheduling request (SR).

Method three: the first communication node informs the second communication node by sending an MAC CE. In the case where the first communication node satisfies the inter-frequency measurement condition, the first communication node sends an MAC CE message to the second communication node. FIG. 5 is a diagram showing a format of a Media Access Control-Control Element (MAC CE) message according to an embodiment of the present application. As shown in FIG. 5, the MAC CE message includes an R bit and a measurement identification bit. R represents a reserved bit, and R is an optional bit; the measurement identification bit (for example, a measurement bit is represented by measurement) represents whether the inter-frequency measurement condition is satisfied, for example, in the case where the measurement identification bits are all 1, indicating that a user satisfies the inter-frequency measurement condition.

Method four: the first communication node informs the second communication node by sending an RRC message. In the case where the first communication node satisfies the inter-frequency measurement condition, the first communication node sends an RRC message to the second communication node. The RRC message may be a measurement report, and the measurement report includes an indication bit of whether the inter-frequency measurement condition is satisfied, for example, a bit, and 1 represents that the first communication node satisfies the inter-frequency measurement condition. The RRC message may also be a new RRC message.

When the message or signal is received by the second communication node, it is determined that the first communication node starts the inter-frequency measurement at a certain moment. In the case where the first communication node successfully sends the message or signal, the first communication node starts the inter-frequency measurement at a certain moment. That is, the inter-frequency measurement is enabled at the first preset occasion as described in the preceding embodiment. In an embodiment, a method for determining the enabling occasion of the inter-frequency measurement includes one of the following.

Method one: a first preset occasion after the uplink data is successfully sent is used as the enabling occasion. In an embodiment, the first preset occasion refers to enabling the inter-frequency measurement after a certain period of time after the first communication node successfully sends the uplink data. That is, after a certain period of time after the first communication node successfully sends the uplink signal or the uplink message, the first communication node starts the inter-frequency measurement. Exemplarily, after the first communication node successfully sends the preamble or PUCCH or MAC CE or RRC message at an occasion n, the inter-frequency measurement starts at occasion (n+k) (that is, the first preset occasion), where k is configured by the second communication node or may be a fixed value.

Method two: an occasion of receiving feedback information of the second communication node is used as the enabling occasion. In an embodiment, after the first communication node receives the feedback, the first communication node starts the inter-frequency measurement. The first communication node successfully receives a feedback Random Access Response (RAR) of the preamble or an HARQ feedback of the MAC CE (for example, Physical Hybrid ARQ Indicator Channel (PHICH) and the PDCCH) or an HARQ feedback of the RRC message, and the first communication node starts the inter-frequency measurement.

Method three: a second preset occasion carried in the uplink data is used as the enabling occasion. In an embodiment, the first communication node carries information of the second preset occasion in the uplink signal or the uplink message. The PUCCH carries the information of the second preset occasion, for example, the occasion after which the first communication node starts the inter-frequency measurement. The PUCCH sequence represents the occasion and 11 represents 3 ms. Alternatively, the MAC CE carries the information of the second preset occasion, for example, the occasion after which the first communication node starts the inter-frequency measurement. FIG. 6 is a diagram showing a format of another MAC CE message according to an embodiment of the present application. As shown in FIG. 6, the MAC CE message in this embodiment includes an R bit and a measurement occasion bit. Among them, the measurement occasion is composed of a bit string, which represents the occasion, and 11 represents 3 ms. Alternatively, the RRC message carries measurement occasion information, for example, the occasion after which the first communication node starts the inter-frequency measurement. In an embodiment, measurement occasion information is composed of a bit string or an enumeration value.

In an implementation manner, the measurement method applied to the first communication node further includes determining an inter-frequency measurement occasion. In an embodiment, after the first communication node satisfies the inter-frequency measurement condition, the first communication node may not inform the base station. However, to prevent the base station from scheduling the first communication node, the first communication node and the second communication node agree on a same rule. After the rule is satisfied, the first communication node enables the inter-frequency measurement, and the second communication node is avoided from scheduling the first communication node.

The rule may be that the first communication node has no data transmission. That is, in the case where the first communication node satisfies the inter-frequency measurement condition and the first communication node has no data transmission, the inter-frequency measurement starts. A method in which the first communication node determines that no data transmission exists may include one of the following.

Method one: within a sixth preset time, the MAC does not receive or send an MAC SDU message. In an embodiment, the MAC does not receive or send the MAC SDU for a certain period of time. For example, in the case where the MAC does not receive or send the MAC SDU, a timer is enabled, and the timer duration is equal to a certain time. In the case where the MAC receives or sends the MAC SDU, the timer is cleared. In the case where the timer expires, it is determined that the first communication node has no data transmission, and the inter-frequency measurement is enabled immediately.

Method two: within a seventh preset time, a buffer of RLC or MAC is empty. In an embodiment, within a certain period of time, the RLC or the MAC has no data packet to be transmitted. For example, in the case where the buffer of the MAC or the RLC has no data packet to be transmitted and is empty, the timer is enabled, and the timer duration is equal to a certain time; and in the case where the buffer of the MAC or the RLC is not empty, the timer is cleared. In the case where the timer expires, it is determined that the first communication node has no data transmission, and the inter-frequency measurement is enabled immediately.

Method three: in an embodiment, a service delay is greater than or equal to a seventeenth preset threshold. For example, in the case where a latency requirement of a bearer or Data Radio Bearer (DRB) of the first communication node or data mapped by a logical channel is greater than a certain threshold, it is determined that the service is not sensitive to the latency requirement, and the first communication node may enable the inter-frequency measurement.

Method four is any combination of methods one to three. For example, method four is a combination of methods one and three, that is, in the case where the latency requirement of the first communication node is greater than a certain threshold and within a certain period of time, the MAC does not receive or send the MAC SDU, then the first communication node may enable the inter-frequency measurement.

In an implementation manner, the case where the preset measurement condition is the measurement configuration information is used as an example for description of a process of whether to enable the neighbor cell measurement. In an embodiment, the second communication node broadcasts parameters of intra-frequency and inter-frequency cell selection in the system information, including: a bin, an offset value of the bin, an offset value of a cell and the like. Cell selection needs to be performed during the RRC re-establishment process. In the cell selection process, the first communication node performs cell selection according to the cell selection parameters broadcasted according to the system information. According to the broadcasted frequency or neighbor cell, the neighbor cell is measured, and the offset value of the cell and other values are applied so as to select an optimal target cell.

Figures 7, 8:
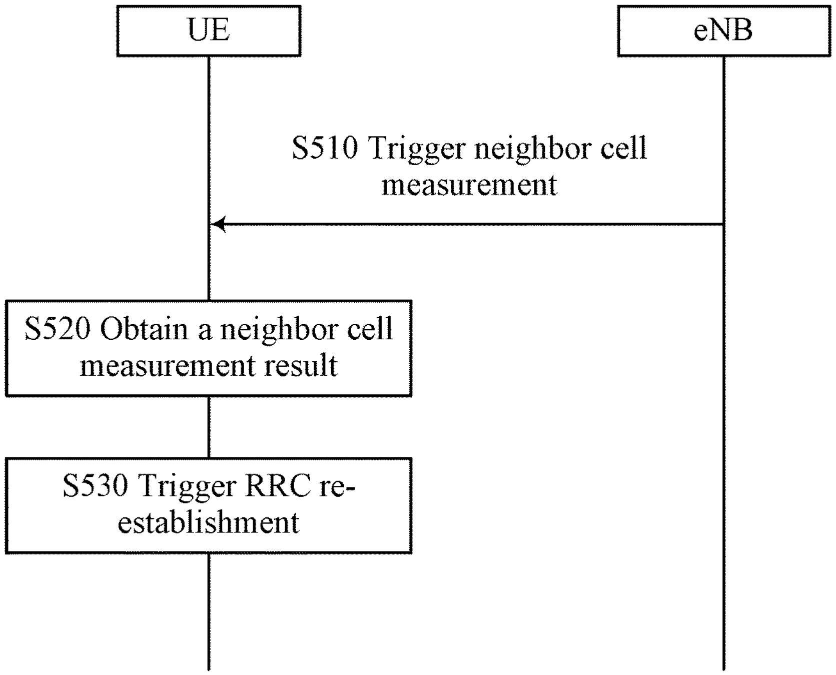
FIG. 7 is a flowchart of transmission of measurement configuration information in a connection state according to an embodiment of the present application.
FIG. 8 is a diagram showing a format of another MAC CE message according to an embodiment of the present application.

In an embodiment, the intra-frequency measurement and the inter-frequency measurement serve the cell selection that needs to be performed during the RRC re-establishment process, and parameters for cell selection need to be provided for connection state measurement configuration. In the connection state, the second communication node configures the measurement configuration for the first communication node. FIG. 7 is a flowchart of transmission of measurement configuration information in a connection state according to an embodiment of the present application. As shown in FIG. 7, this embodiment includes S510 and S530.

In S510, neighbor cell measurement is triggered.

In S520, a neighbor cell measurement result is obtained.

In S530, RRC re-establishment is triggered.

In an embodiment, the second communication node configures measurement configuration information for the first communication node, the measurement configuration information includes intra-frequency and/or inter-frequency configuration information, and the measurement configuration information includes one of the following.

Method one: the measurement configuration information includes first measurement configuration information carried in an RRC message. In an embodiment, the first measurement configuration information includes a measurement frequency value and a cell selection parameter under each bin. In an embodiment, the second communication node provides the first measurement configuration information for cell selection through an RRC message. The first measurement configuration information includes the measurement frequency value and the parameter configured for cell selection under each bin, including a minimum reception level of the RSRP and RSRQ of the neighbor cell, an offset value of the RSRP and RSRQ of the neighbor cell, a neighbor cell list and the like. For example, the first measurement configuration information includes configurations of multiple frequencies, where the configuration of a certain frequency includes an Absolute Radio Frequency Channel Number (ARFCN) of a certain frequency, and parameters such as the minimum reception level of the RSRP and RSRQ of the neighbor cell under this bin, the offset value of the RSRP and RSRQ of the neighbor cell, and the neighbor cell list. The first communication node receives the first measurement configuration information, measures frequencies and neighbor cells included in the first measurement configuration information, and selects a target cell according to an S criterion according to the cell selection parameters provided by the first measurement configuration information.

Method two: the measurement configuration information includes second measurement configuration information carried in the RRC message. In an embodiment, the second measurement configuration information includes a measurement frequency index. In an embodiment, the second communication node provides measurement configuration for cell selection through the RRC message. The system information provides a correspondence between the frequency and the frequency index and the second measurement configuration information includes the measurement frequency index. For example, the system information provides configurations of multiple frequencies, where the configuration of a certain frequency includes an ARFCN, an index value of this bin, and parameters such as the minimum reception level of the RSRP and RSRQ of the neighbor cell under this bin, the offset value of the RSRP and RSRQ of the neighbor cell, and the neighbor cell list, and the second measurement configuration information provides multiple frequency index values. The first communication node receives the second measurement configuration information, finds the correspondence between the frequency index provided by the second measurement configuration information and the frequency provided by the system information, and selects a target cell according to the S criterion according to the cell selection parameters provided by the system information.

Alternatively, the system information provides the correspondence between the frequency and the frequency index or provides an order of frequencies. The measurement configuration carries a bit string so as to provide the frequency to be measured. A first bit of the bit string corresponds to the intra-frequency, a second bit corresponds to the first inter-frequency broadcasted by the system information or the inter-frequency with the smallest frequency index, and so on. Multiple bits with an order from low to high sequentially correspond to the frequencies broadcasted by the system information. A certain bit is set to 1, and the frequency measurement is enabled correspondingly. For example, the bit string is 1010, and a second inter-frequency frequency in the corresponding system information is M. After the first communication node receives the second measurement configuration information, the first communication node enables the intra-frequency measurement and the measurement on frequency M according to the bit string.

Method three: the measurement configuration information includes measurement configuration information activated by an MAC CE message. In an embodiment, the second communication node activates the measurement through the MAC CE. The system information or the measurement configuration information activated by the MAC CE message provides the measurement configuration, such as methods one and two, including a bin, a frequency index, and measurement activated by the MAC CE, or a frequency index to be measured is provided, and measurement on this frequency is activated. For example, the system information provides configurations of multiple frequencies, where the configuration of a certain frequency includes an ARFCN, an index value of this frequency, and parameters such as the minimum reception level of the RSRP and RSRQ of the neighbor cell under this frequency, the offset value of the RSRP and RSRQ of the neighbor cell, and the neighbor cell list, and the MAC CE carries an activation measurement identification bit. FIG. 8 is a diagram showing a format of another MAC CE message according to an embodiment of the present application. As shown in FIG. 8, the format of the MAC CE message in this embodiment includes an R bit and an activation measurement identification bit. As shown in the figure below, the activation measurement identification bit is configured for indicating whether the intra-frequency measurement or the inter-frequency measurement is activated. For example, the activation measurement identification bit is 01, indicating that the intra-frequency is activated; the activation measurement identification bit is 10, indicating that the inter-frequency is activated; and the activation measurement identification bit is 11, indicating that the inter-frequency and the intra-frequency are activated. After receiving the MAC CE, the first communication node enables corresponding measurement according to the activation measurement identification bit.

Figures 9, 10, 11:
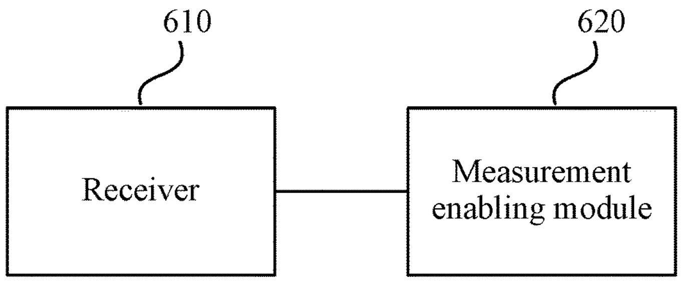
FIG. 9 is a diagram showing a format of another MAC CE message according to an embodiment of the present application.
FIG. 10 is a diagram showing a format of another MAC CE message according to an embodiment of the present application.
FIG. 11 is a structural diagram of a measurement apparatus according to an embodiment of the present application.

Alternatively, the MAC CE message carries an activation measurement frequency index. In an embodiment, the MAC CE carries the activation measurement frequency index and the MAC CE may carry multiple activation measurement frequency indices or one activation measurement frequency index. FIG. 9 is a diagram showing a format of another MAC CE message according to an embodiment of the present application. As shown in FIG. 9, the MAC CE message carries the R bit and may also carry one or more activation measurement frequency indices. For example, activation measurement frequency index 1, activation measurement frequency index 2, activation measurement frequency index 3, . . . , and activation measurement frequency index N may be carried. N may be a positive integer greater than or equal to 1. The frequency measurement is enabled through an activation measurement frequency index identification. For example, the activation measurement frequency index is 11, which corresponds to frequency M in the system information. After receiving the MAC CE, the first communication node enables measurement on frequency M according to the activation measurement frequency index.

Alternatively, the MAC CE message carries a bit string. In an embodiment, the MAC CE message carries the bit string, where a first bit corresponds to the intra-frequency, a second bit corresponds to the first inter-frequency broadcasted by the system information or the inter-frequency with the smallest frequency index, and so on. Multiple bits with an order from low to high sequentially correspond to the frequencies broadcasted by the system information. FIG. 10 is a diagram showing a format of another MAC CE message according to an embodiment of the present application. As shown in FIG. 10, the format of the MAC CE message may carry the R bit and may also carry the bit string. A certain bit is set to 1, and the frequency measurement is enabled correspondingly. For example, the bit string is 1010, and a second inter-frequency frequency in the corresponding system information is M. After the first communication node receives the MAC CE, the first communication node enables the intra-frequency measurement and the measurement on frequency M according to the bit string.

Method four: the measurement configuration information includes measurement configuration information activated by a DCI message. In an embodiment, the second communication node activates the measurement through the DCI message. The system information or the measurement configuration information activated by the DCI message provides the measurement configuration, such as methods one and two, including a bin, a frequency index, and measurement activated by the DCI, or a frequency index to be measured is provided, and measurement on this frequency is activated. For example, the system information provides configurations of multiple frequencies, where the configuration of a certain frequency includes an ARFCN, an index value of this bin, and parameters such as the minimum reception level of the RSRP and RSRQ of the neighbor cell under this bin, the offset value of the RSRP and RSRQ of the neighbor cell, and the neighbor cell list, and the DCI carries an activation measurement identification bit. The activation measurement identification bit is configured for indicating whether the intra-frequency measurement or the inter-frequency measurement is activated. For example, the activation measurement identification bit is 01, indicating that the intra-frequency is activated; the activation measurement identification bit is 10, indicating that the inter-frequency is activated; and the activation measurement identification bit is 11, indicating that the inter-frequency and the intra-frequency are activated. After receiving the DCI, the first communication node enables corresponding measurement according to the activation measurement identification bit.

Alternatively, the DCI message carries an activation measurement frequency index. In an embodiment, the DCI message carries the activation measurement frequency index and the DCI may carry multiple activation measurement frequency indices or one activation measurement frequency index. The frequency measurement is enabled through an activation measurement frequency index identification. For example, the activation measurement frequency index is 11, which corresponds to frequency M in the system information. After receiving the DCI, the first communication node enables measurement on frequency M according to the activation measurement frequency index.

Alternatively, the DCI message carries a bit string. In an embodiment, the DCI carries the bit string, where a first bit corresponds to the intra-frequency, a second bit corresponds to the first inter-frequency broadcasted by the system information or the inter-frequency with the smallest frequency index, and so on. Multiple bits with an order from low to high sequentially correspond to the frequencies broadcasted by the system information. Exemplarily, a certain bit is set to 1, and the frequency measurement is enabled correspondingly. For example, the bit string is 1010, and a second inter-frequency frequency in the corresponding system information is M. After the first communication node receives the DCI, the first communication node enables the intra-frequency measurement and the measurement on frequency M according to the bit string.

In an implementation manner, when measuring a neighbor cell, the first communication node not only needs to measure a Narrow-band Reference Signal (NRS), but also needs to identify a cell identifier of the neighbor cell. If the first communication node does not know occasion information of the neighbor cell, such as a System Frame Number (SFN) and a slot, the first communication node needs to perform blind search on references signals (for example, the NRS, a Secondary Synchronization Signal (SSS), a Primary Synchronization Signal (PSS) and the like) so that the first communication node needs to consume a lot of time and power consumption. To reduce the power consumption of the first communication node, the second communication node configures neighbor cell time-frequency information or informs the first communication node of the neighbor cell time-frequency information, and the first communication node may detect the signal and perform measurement on corresponding time-frequency.

In an embodiment, the case where the preset measurement condition is the neighbor cell time-frequency information is used as an example for description of whether to enable the neighbor cell measurement.

In an embodiment, the second communication node configures the time-frequency information of the intra-frequency or inter-frequency neighbor cell for the first communication node through system information broadcast or an RRC message. The time-frequency information of the intra-frequency or inter-frequency neighbor cell may be neighbor cells within one frequency sharing the same time-domain or frequency-domain information, or may be time-frequency information of each cell. If the second communication node provides both the time-domain or frequency-domain information shared in the frequency, and the time-domain or frequency-domain information of some cells (represented by cell identifiers), then, for this frequency, the first communication node may use the time-frequency information of this cell for a certain cell and use the shared time-frequency information of the frequency for other cells.

In an embodiment, the time-domain information may be a time domain position of a measurement occasion or a transmission occasion of a measurement signal, including the measurement occasion or start time of the transmission occasion of the measurement signal, a period, a duration and the like, or a number of radio frames or subframes or slots or symbols for an offset of the neighbor cell relative to the serving cell.

In an embodiment, the frequency-domain information may also be a frequency domain position of a measurement frequency, a measurement bandwidth or the measurement signal, including a measurement start position, a frequency domain bandwidth, and the like.

For example, the second communication node configures intra-frequency information and multiple pieces of inter-frequency information through system information broadcast or an RRC reconfiguration message. The intra-frequency information and each piece of inter-frequency information include time-domain information of the neighbor cell within this bin, and the time-domain information includes the number of subframes for the offset of the neighbor cell relative to the serving cell. At the same time, the second communication node indicates cell identifiers of some cells and configures dedicated time-domain information, where the time-domain information includes the number of subframes for the offset of the neighbor cell relative to the serving cell. After the first communication node receives the time-domain information, for a certain bin, if the neighbor cells with the cell identifiers are indicated, the first communication node acquires the measurement occasion or the transmission occasion of the measurement signal of these neighbor cells by using the number of subframes for the offset of the neighbor cells relative to the serving cell. For other cells, the first communication node acquires the measurement occasion or the transmission occasion of the measurement signal of these neighbor cells by using the number of subframes for the offset of a shared neighbor cell in the frequency relative to the serving cell.

In an implementation manner, when the second communication node configures the measured neighbor cell for the first communication node, if the second communication node configures all neighbor cells near the serving cell to the first communication node for the first communication node to perform measurement, the power consumption of the first communication node increases and the measurement is inefficient. However, the second communication node may determine the position of the first communication node through neighbor cell information reported by the first communication node. For example, the first communication node reports that the strongest neighbor cell measured by the first communication node is X, and the second communication node may determine that the first communication node is located near the neighbor cell X and then configure that the first communication node measures neighbor cells near the neighbor cell X, thereby greatly improving the validity of the measurement. In view of this, the present application provides a measurement method applied to a first communication node, including sending uplink data carrying strongest neighbor cell information of the first communication node to a second communication node; and receiving neighbor cell measurement configuration information fed back by the second communication node, where the neighbor cell measurement configuration information is measurement information configured by the second communication node according to the strongest neighbor cell information.

In an embodiment, through the system information, the second communication node enables the first communication node whether to report the strongest neighbor cell. If the first communication node is enabled, the first communication node carries the strongest neighbor cell in uplink data. The uplink data may be an RRC message or an MAC CE. The RRC message may be initiated by the first communication node from an idle state to a connection state or initiated in the idle state, and the RRC message includes at least an RRC establishment request, an RRC re-establishment request, an RRC recovery request, an RRC early data request or the like. The MAC CE may be multiplexed with the RRC message. The strongest neighbor cell may not include the serving cell and may be the neighbor cell with the strongest signal quality, or the neighbor cell with the largest RSRP/RSRQ measurement value, or the neighbor cell with the RSRP/RSRQ greater than or equal to a certain threshold and the largest RSRP/RSRQ measurement value.

The second communication node may enable the first communication node whether to report the strongest neighbor cell under a certain frequency or some frequencies and may enable the first communication node whether to report the strongest neighbor cell under all frequencies broadcasted by the system information. For example, the second communication node broadcasts the intra-frequency and inter-frequency information through the system information, where the information may include a frequency, a frequency index, a cell identifier of a neighbor cell, and the like. Under each frequency, the second communication node uses 1 bit, where 1 represents enabling the first communication node to report the strongest neighbor cell under this frequency; otherwise, the first communication node is disabled. Alternatively, the second communication node uses 1 bit, where 1 represents enabling the first communication node to report the strongest neighbor cell of each frequency (the intra-frequency and inter-frequency broadcasted by the system information); otherwise, the first communication node is disabled.

Alternatively, the second communication node broadcasts the intra-frequency information through the system information, where the intra-frequency information includes a bin, a frequency index, a cell identifier of a neighbor cell, and the like. The second communication node uses 1 bit, where 1 represents enabling the first communication node to report the intra-frequency strongest neighbor cell; otherwise, the first communication node is disabled. Alternatively, the second communication node uses 1 bit, where 1 represents enabling the first communication node to report the strongest neighbor cell of all frequencies (the intra-frequency and inter-frequency broadcasted by the system information); otherwise, the first communication node is disabled.

After the first communication node receives he system information, the first communication node performs measurement according to the system information and obtains the intra-frequency and inter-frequency strongest neighbor cell, and if a threshold of the strongest neighbor cell is configured, the RSRP/RSRQ of this neighbor cell being greater than or equal to the threshold. A method in which the RRC message carries the strongest neighbor cell includes one of: if the second communication node enables the first communication node to report the strongest neighbor cell of some frequencies, the first communication node carries one list through the RRC message, and each item includes a frequency index and a cell identifier of the corresponding strongest neighbor cell; if the second communication node enables the first communication node to report the strongest neighbor cell of all frequencies, the first communication node carries one list through the RRC message, and each item includes a frequency index and a cell identifier of the corresponding strongest neighbor cell; or the first communication node carries one list through the RRC message, and each item sequentially carries cell identifiers of corresponding strongest neighbor cells in an order of broadcast frequencies or an order of frequency indices; if the second communication node enables the first communication node to report the intra-frequency strongest neighbor cell, the first communication node carries a cell identifier of the strongest neighbor cell through the RRC message; or if the second communication node enables the first communication node to report the strongest neighbor cell among all frequencies, the first communication node carries a cell identifier of the strongest neighbor cell and the corresponding frequency index through the RRC message.

A method in which the MAC CE carries the strongest neighbor cell includes one of: if the second communication node enables the first communication node to report the strongest neighbor cell of some frequencies, the first communication node carries the frequency index and a cell identifier of the corresponding strongest neighbor cell through the MAC CE; if the second communication node enables the first communication node to report the strongest neighbor cell of all frequencies, the first communication node carries the frequency index and a cell identifier of the corresponding strongest neighbor cell through the MAC CE; or the first communication node carries a cell identifier through the MAC CE, and each item sequentially carries cell identifiers of corresponding strongest neighbor cells in an order of broadcast frequencies or an order of frequency indices; if the second communication node enables the first communication node to report the intra-frequency strongest neighbor cell, the first communication node carries a cell identifier of the strongest neighbor cell through the MAC CE; or if the second communication node enables the first communication node to report the strongest neighbor cell among all frequencies, the first communication node carries a cell identifier of the strongest neighbor cell and the corresponding frequency index through the MAC CE.

Alternatively, the first communication node may also report the measurement result of the strongest neighbor cell, such as the RSRP and/or RSRQ and/or SINR.

After the first communication node receives the system information, the first communication node performs measurement according to the system information and obtains the intra-frequency and inter-frequency strongest neighbor cell. A method in which the RRC carries the strongest neighbor cell includes one of: if the second communication node enables the first communication node to report the strongest neighbor cell of some frequencies, the first communication node carries one list through the RRC message, and each item includes a frequency index, a cell identifier of the corresponding strongest neighbor cell, and the measurement result of the strongest neighbor cell, such as the RSRP and/or RSRQ; if the second communication node enables the first communication node to report the strongest neighbor cell of all frequencies, the first communication node carries one list through the RRC message, and each item includes a frequency index, a cell identifier of the corresponding strongest neighbor cell, and the measurement result of the strongest neighbor cell, such as the RSRP and/or RSRQ; or the first communication node carries one list through the RRC message, and each item sequentially carries cell identifiers of corresponding strongest neighbor cells and measurement results of the strongest neighbor cells, such as the RSRP and/or RSRQ in an order of broadcast frequencies or an order of frequency indices; if the second communication node enables the first communication node to report the intra-frequency strongest neighbor cell, the first communication node carries a cell identifier of the strongest neighbor cell and the measurement result of the strongest neighbor cell, such as the RSRP and/or RSRQ through the RRC message; or if the second communication node enables the first communication node to report the strongest neighbor cell among all frequencies, the first communication node carries a cell identifier of the strongest neighbor cell, the corresponding frequency index, and the measurement result of the strongest neighbor cell, such as the RSRP and/or RSRQ through the RRC message.

A method in which the MAC CE carries the strongest neighbor cell includes one of: if the second communication node enables the first communication node to report the strongest neighbor cell of some frequencies, the first communication node carries the frequency index, a cell identifier of the corresponding strongest neighbor cell, and the measurement result of the strongest neighbor cell, such as the RSRP and/or RSRQ through the MAC CE; if the second communication node enables the first communication node to report the strongest neighbor cell of all frequencies, the first communication node carries the frequency index, a cell identifier of the corresponding strongest neighbor cell, and the measurement result of the strongest neighbor cell, such as the RSRP and/or RSRQ through the MAC CE; or the first communication node carries a cell identifier through the MAC CE, and each item sequentially carries cell identifiers of corresponding strongest neighbor cells and measurement results of the strongest neighbor cells, such as the RSRP and/or RSRQ in an order of broadcast frequencies or an order of frequency indices; if the second communication node enables the first communication node to report the intra-frequency strongest neighbor cell, the first communication node carries a cell identifier of the strongest neighbor cell and the measurement result of the strongest neighbor cell, such as the RSRP and/or RSRQ through the MAC CE; or if the second communication node enables the first communication node to report the strongest neighbor cell among all frequencies, the first communication node carries a cell identifier of the strongest neighbor cell, the corresponding frequency index, and the measurement result of the strongest neighbor cell, such as the RSRP and/or RSRQ through the MAC CE.

In an embodiment, FIG. 11 is a structural diagram of a measurement apparatus according to an embodiment of the present application. This embodiment is applied to a first communication node. Exemplarily, the first communication node is a terminal (for example, a UE). As shown in FIG. 11, this embodiment includes a receiver 610 and a measurement enabling module 620.

The receiver 610 is configured to receive a preset measurement condition configured by a second communication node.

The measurement enabling module 620 is configured to enable measurement on a neighbor cell corresponding to a serving cell where the first communication node is located according to the preset measurement condition.

The measurement apparatus provided in this embodiment is configured to perform the measurement method of the embodiment shown in FIG. 1. The implementation principle and technical effects of the measurement apparatus provided in the embodiment are similar and are not repeated here.

In an embodiment, the preset measurement condition includes one of: satisfying a trigger condition for enabling intra-frequency measurement or inter-frequency measurement; validity of a measurement value; measurement configuration information; or neighbor cell time-frequency information. A trigger condition for the validity of the measurement value refers to that in the case where measurement values of intra-frequency, inter-frequency, a frequency or the neighbor cell satisfy a preset condition, measurement does not need to be performed on the intra-frequency, the inter-frequency, the frequency or the neighbor cell.

In an embodiment, in the case where the trigger condition for enabling the intra-frequency measurement or the inter-frequency measurement is that a signal quality of the serving cell where the first communication node is located deteriorates, a method for determining the deterioration of the signal quality of the serving cell where the first communication node is located includes at least one of: within a first preset time, the signal quality of the serving cell being less than or equal to a first preset threshold; within a second preset time, a downlink radio link quality of the serving cell being less than or equal to a second preset threshold; Radio Resource Control (RRC) receives an out of sync indication reported by a physical layer; within a third preset time, a number of out of sync indications reported by the physical layer and received by the RRC being greater than or equal to a third preset threshold; a number of out of sync indications reported by the physical layer and continuously received by the RRC being greater than or equal to a fourth preset threshold; with a fourth preset time, a number of undetected Physical Downlink Control Channels (PDCCHs) being greater than or equal to a fifth preset threshold; a number of continuously undetected PDCCHs being greater than or equal to a sixth preset threshold; a maximum number of repetitions of a Narrow Physical Downlink Control Channel (NPDCCH) being greater than or equal to a seventh preset threshold; a maximum number of repetitions of a Narrow Physical Downlink Shared Channel (NPDSCH) being greater than or equal to an eighth preset threshold; a retransmission rate of a Hybrid Automatic Repeat reQuest (HARD) being greater than or equal to a ninth preset threshold; within a fifth preset time, a signal quality variation value of the serving cell being greater than or equal to a tenth preset threshold; a signal quality of an intra-frequency neighbor cell being less than or equal to an eleventh preset threshold and the inter-frequency measurement is enabled; or a duration of enabling the intra-frequency measurement or the inter-frequency measurement being greater than or equal to a twelfth preset threshold.

In an embodiment, the signal quality of the serving cell or the neighbor cell is represented by at least one of parameters: an RSRP value; an RSRQ value; or an SINR value.

In an embodiment, the downlink radio link quality of the serving cell is represented by at least one of parameters: an RSRP value; or a BLER value.

In an embodiment, a condition for determining the validity of the measurement value includes at least one of: a measurement end duration reaches a thirteenth preset threshold; a duration of enabling search or measurement reaches a fourteenth preset threshold; a signal quality variation value of the serving cell reaches a fifteenth preset threshold; or current measurement times of the intra-frequency or the inter-frequency are less than or equal to a sixteenth preset threshold.

In an embodiment, the measurement apparatus applied to the first communication node further includes a report module configured to report uplink data carrying a neighbor cell measurement state indication to the second communication node, where the neighbor cell measurement state indication includes at least one of: an indication of satisfying the intra-frequency measurement or the inter-frequency measurement; an indication of about to enable the intra-frequency measurement or the inter-frequency measurement; or an indication of a request for enabling the intra-frequency measurement or the inter-frequency measurement.

In an embodiment, the uplink data carrying the neighbor cell measurement state indication includes one of: a random access preamble; a PUCCH message; an MAC CE message; or an RRC message.

In an embodiment, after the uplink data carrying the neighbor cell measurement state indication is reported to the second communication node, the method further includes the following.

An enabling occasion of the inter-frequency measurement is determined, where a method for determining the enabling occasion includes one of: using a first preset occasion after the uplink data is successfully sent as the enabling occasion; using an occasion of successfully receiving feedback information of the second communication node as the enabling occasion; or using a second preset occasion carried in the uplink data as the enabling occasion.

In an embodiment, the measurement method applied to the first communication node further includes a determination module configured to determine an inter-frequency measurement occasion, where the inter-frequency measurement occasion includes an occasion when the first communication node does not transmit data to the second communication node, or an occasion when the first communication node does not receive data from the second communication node.

In an embodiment, a method for determining the inter-frequency measurement occasion includes one of: within a sixth preset time, the MAC not receiving or sending an MAC SDU message; within a seventh preset time, a buffer of RLC or MAC is empty; or a service delay being greater than or equal to a seventeenth preset threshold.

In an embodiment, the measurement configuration information includes one of: first measurement configuration information carried in an RRC message; second measurement configuration information carried in the RRC message; measurement configuration information activated by an MAC CE message; or measurement configuration information activated by a DCI message.

In an embodiment, the first measurement configuration information includes a measurement frequency value and a cell selection parameter under each frequency; and the second measurement configuration information includes a measurement frequency index.

In an embodiment, the measurement configuration information activated by the MAC CE message includes one of: an activation measurement identification bit carried in the MAC CE message; an activation measurement frequency index carried in the MAC CE message; or a bit string carried in the MAC CE message; where the activation measurement identification bit is configured for indicating whether the intra-frequency measurement and/or the inter-frequency measurement is activated; and the bit string is configured for indicating that whether measurement on a certain frequency represented by a bit is enabled.

In an embodiment, the measurement configuration information activated by the DCI message includes one of: an activation measurement identification bit carried in the DCI message; an activation measurement frequency index carried in the DCI message; or a bit string carried in the DCI message; where the activation measurement identification bit is configured for indicating that the intra-frequency measurement and/or the inter-frequency measurement is activated; and the bit string is configured for indicating that whether measurement on a certain frequency represented by a bit is enabled.

In an embodiment, the neighbor cell time-frequency information is time-frequency information of an intra-frequency or inter-frequency neighbor cell broadcasted by system information or configured by an RRC message.

In an embodiment, the neighbor cell time-frequency information includes a time domain position of a measurement occasion or a transmission occasion of a measurement signal; and a frequency domain position of a measurement frequency, a measurement bandwidth or the measurement signal.

Figure 12:
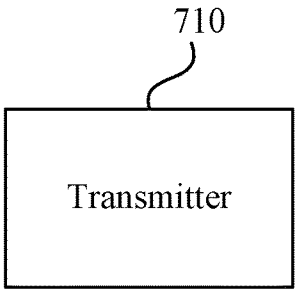
FIG. 12 is a structural diagram of another measurement apparatus according to an embodiment of the present application.

In an embodiment, FIG. 12 is a structural diagram of another measurement apparatus according to an embodiment of the present application. This embodiment is applied to a first communication node. As shown in FIG. 12, this embodiment includes a transmitter 710.

The transmitter 710 is configured to send uplink data carrying strongest neighbor cell information of the first communication node to a second communication node.

The measurement apparatus provided in this embodiment is configured to perform the measurement method of the embodiment shown in FIG. 2. The implementation principle and technical effects of the measurement apparatus provided in the embodiment are similar and are not repeated here.

In an embodiment, the measurement apparatus applied to the first communication node further includes a receiver configured to receive strongest neighbor cell enable indication information sent by the second communication node, where the strongest neighbor cell enable indication information is configured for indicating whether the first communication node supports reporting a strongest neighbor cell under a preset frequency.

In an embodiment, the uplink data carrying the strongest neighbor cell information of the first communication node includes an RRC message initiated in an idle state or an inactive state; and an MAC CE message.

In an embodiment, a method of the RRC message carrying the strongest neighbor cell information includes one of.

The RRC message carries one list including a frequency index and a cell identifier corresponding to the strongest neighbor cell; the RRC message carries the frequency index and the cell identifier corresponding to the strongest neighbor cell; the RRC message carries a list of cell identifiers of sequentially corresponding strongest neighbor cells in an order of frequencies or an order of frequency indices; or the RRC message carries a cell identifier of the strongest neighbor cell.

In an embodiment, a method of the MAC CE message carrying the strongest neighbor cell information includes one of: the MAC CE message carries one list including a frequency index and a cell identifier corresponding to the strongest neighbor cell; the MAC CE message carries the frequency index and the cell identifier corresponding to the strongest neighbor cell; the MAC CE message carries a list of cell identifiers of sequentially corresponding strongest neighbor cells in an order of frequencies or an order of frequency indices; or the MAC CE message carries a cell identifier of an intra-frequency strongest neighbor cell.

In an embodiment, a strongest neighbor cell includes one of: a neighbor cell with a largest measurement value of RSRP or RSRQ or an SINR; or a neighbor cell with the RSRP or RSRQ or SINR greater than or equal to an eighteenth preset threshold and the largest measurement value of the RSRP or RSRQ or SINR.

In an embodiment, the strongest neighbor cell information includes one of: a bin, a frequency index, a cell identifier of a neighbor cell, or a signal quality value.

Figure 13:
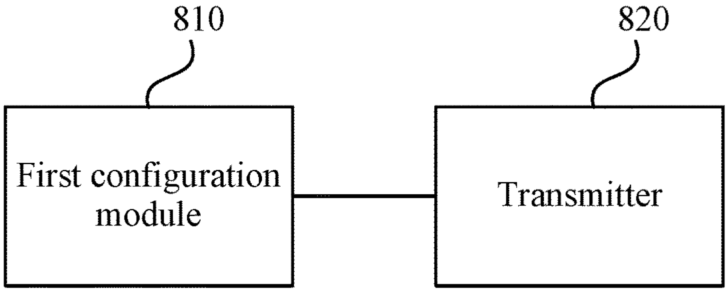
FIG. 13 is a structural diagram of another measurement apparatus according to an embodiment of the present application.

In an embodiment, FIG. 13 is a structural diagram of another measurement apparatus according to an embodiment of the present application. This embodiment is applied to a second communication node. Exemplarily, the second communication node may be a base station or a network side. As shown in FIG. 13, this embodiment includes a first configuration module 810 and a transmitter 820.

The first configuration module 810 is configured to configure a preset measurement condition, where the preset measurement condition is configured for enabling measurement on a neighbor cell corresponding to a serving cell where a first communication node is located.

The transmitter 820 is configured to send the preset measurement condition to the first communication node.

The measurement apparatus provided in this embodiment is configured to perform the measurement method of the embodiment shown in FIG. 3. The implementation principle and technical effects of the measurement apparatus provided in the embodiment are similar and are not repeated here.

In an embodiment, the preset measurement condition includes one of: satisfying a trigger condition for enabling intra-frequency measurement or inter-frequency measurement; validity of a measurement value; measurement configuration information; or neighbor cell time-frequency information.

In an embodiment, a trigger condition for the validity of the measurement value refers to that in the case where measurement values of intra-frequency, inter-frequency, a frequency or the neighbor cell satisfy a preset condition, measurement does not need to be performed on the intra-frequency, the inter-frequency, the frequency or the neighbor cell. That is, in the case where the first communication node satisfies the trigger condition for enabling the intra-frequency measurement or the inter-frequency measurement, the first communication node may continue to perform the intra-frequency measurement and the inter-frequency measurement, thereby repeatedly triggering the measurement on the neighbor cell, resulting in the increase of the power consumption of the first communication node. For this reason, in the case where the trigger condition for enabling the intra-frequency measurement or the inter-frequency measurement is satisfied, the measurement time or measurement times are limited, that is, in the case where the neighbor cell measurement time or neighbor cell measurement times do not satisfy the preset condition, the measurement on the neighbor cell does not need to be enabled, thereby reducing the power consumption of the first communication node.

In an embodiment, in the case where the trigger condition for enabling the intra-frequency measurement or the inter-frequency measurement is that a signal quality of the serving cell where the first communication node is located deteriorates, a method for determining the deterioration of the signal quality of the serving cell where the first communication node is located includes at least one of the following: within a first preset time, the signal quality of the serving cell being less than or equal to a first preset threshold; within a second preset time, a downlink radio link quality of the serving cell being less than or equal to a second preset threshold; RRC receives an out of sync indication reported by a physical layer; within a third preset time, a number of out of sync indications reported by the physical layer and received by the RRC being greater than or equal to a third preset threshold; a number of out of sync indications reported by the physical layer and continuously received by the RRC being greater than or equal to a fourth preset threshold; with a fourth preset time, a number of undetected PDCCHs being greater than or equal to a fifth preset threshold; a number of continuously undetected PDCCHs being greater than or equal to a sixth preset threshold; a maximum number of repetitions of an NPDCCH being greater than or equal to a seventh preset threshold; a maximum number of repetitions of an NPDSCH being greater than or equal to an eighth preset threshold; a retransmission rate of an HARQ being greater than or equal to a ninth preset threshold; within a fifth preset time, a signal quality variation value of the serving cell being greater than or equal to a tenth preset threshold; a signal quality of an intra-frequency neighbor cell being less than or equal to an eleventh preset threshold and the inter- frequency measurement is enabled; or a duration of enabling the intra-frequency measurement or the inter-frequency measurement being greater than or equal to a twelfth preset threshold.

In an embodiment, the signal quality of the serving cell or the neighbor cell is represented by at least one of the following parameters: an RSRP value; an RSRQ value; or an SINR value.

In an embodiment, the downlink radio link quality of the serving cell is represented by at least one of the following parameters: an RSRP value; or a BLER value.

In an embodiment, a condition for determining the validity of the measurement value includes at least one of the following: a measurement end duration reaches a thirteenth preset threshold; a duration of enabling search or measurement reaches a fourteenth preset threshold; a signal quality variation value of the serving cell reaches a fifteenth preset threshold; or current measurement times of the intra-frequency or the inter-frequency are less than or equal to a sixteenth preset threshold. The validity of the measurement value refers to that in the case where measurement values of intra-frequency, inter-frequency, a frequency or the neighbor cell satisfy a preset condition, measurement does not need to be performed on the intra-frequency, the inter-frequency, the frequency or the neighbor cell.

In an embodiment, the measurement apparatus applied to the second communication node further includes a receiver configured to receive uplink data carrying a neighbor cell measurement state indication reported by the first communication node, where the neighbor cell measurement state indication includes at least one of: an indication of satisfying the intra-frequency measurement or the inter-frequency measurement; an indication of about to enable the intra-frequency measurement or the inter-frequency measurement; or an indication of a request for enabling the intra-frequency measurement or the inter-frequency measurement.

In an embodiment, the uplink data carrying the neighbor cell measurement state indication includes one of: a random access preamble; a PUCCH message; an MAC CE message; or an RRC message.

In an embodiment, after the uplink data carrying the neighbor cell measurement state indication reported by the first communication node is received, the method further includes the following.

An enabling occasion of the inter-frequency measurement is configured, where a method for determining the enabling occasion includes one of: using a first preset occasion after the uplink data is successfully sent as the enabling occasion; using an occasion of successfully receiving feedback information of the second communication node as the enabling occasion; or using a second preset occasion carried in the uplink data as the enabling occasion.

In an embodiment, the measurement apparatus applied to the second communication node further includes a second configuration module configured to configure an inter-frequency measurement occasion, where the inter-frequency measurement occasion includes an occasion when the first communication node does not transmit data to the second communication node, or an occasion when the first communication node does not receive data from the second communication node.

In an embodiment, a method for determining the inter-frequency measurement occasion includes one of: within a sixth preset time, the MAC not receiving or sending an MAC SDU message; within a seventh preset time, a buffer of RLC or MAC is empty; or a service delay being greater than or equal to a seventeenth preset threshold.

In an embodiment, the measurement configuration information includes one of: first measurement configuration information carried in an RRC message; second measurement configuration information carried in the RRC message; measurement configuration information activated by an MAC CE message; or measurement configuration information activated by a DCI message.

In an embodiment, the first measurement configuration information includes a measurement frequency value and a cell selection parameter under each frequency; and the second measurement configuration information includes a measurement frequency index.

In an embodiment, the measurement configuration information activated by the MAC CE message includes one of: an activation measurement identification bit carried in the MAC CE message; an activation measurement frequency index carried in the MAC CE message; or a bit string carried in the MAC CE message; where the activation measurement identification bit is configured for indicating whether the intra-frequency measurement and/or the inter-frequency measurement is activated; and the bit string is configured for indicating that whether measurement on a certain frequency represented by a bit is enabled.

In an embodiment, the measurement configuration information activated by the DCI message includes one of: an activation measurement identification bit carried in the DCI message; an activation measurement frequency index carried in the DCI message; or a bit string carried in the DCI message; where the activation measurement identification bit is configured for indicating the intra-frequency measurement or the inter-frequency measurement is activated; and the bit string is configured for indicating that whether measurement on a certain frequency represented by a bit is enabled.

In an embodiment, the neighbor cell time-frequency information is time-frequency information of an intra-frequency or inter-frequency neighbor cell broadcasted by system information or configured by an RRC message.

In an embodiment, the neighbor cell time-frequency information includes a time domain position of a measurement occasion or a transmission occasion of a measurement signal; and a frequency domain position of a measurement frequency, a measurement bandwidth or the measurement signal.

Figure 14:
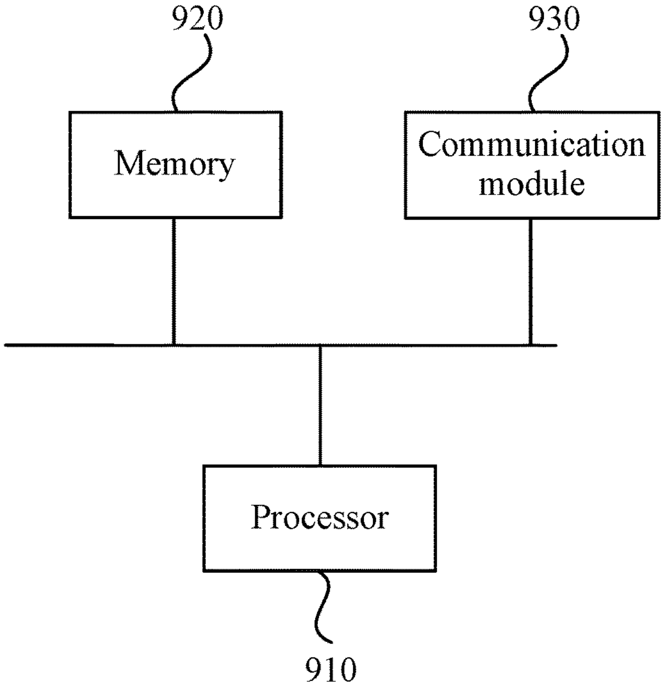
FIG. 14 is a structural diagram of a device according to an embodiment of the present application.

FIG. 14 is a structural diagram of a device according to an embodiment of the present application. As shown in FIG. 14, the device provided in the present application includes a processor 910, a memory 920, and a communication module 930. One or more processors 910 may be provided in the device, and FIG. 14 is illustrated by using an example in which one processor 910 is provided. One or more memories 920 may be provided in the device, and FIG. 14 is illustrated by using an example in which one memory 920 is provided. The processor 910, the memory 920, and the communication module 930 in the device may be connected by a bus or in other manners. FIG. 14 shows a connection by the bus as an example. In this embodiment, the device is a first communication node.

The memory 920, as a computer-readable storage medium, may be configured to store software programs and computer executable programs and modules such as program instructions/modules corresponding to the device in any embodiment of the present application (such as a receiver and a measurement enabling module in the measurement apparatus). The memory 920 may include a program storage region and a data storage region, where the program storage region may store an operating system and an application program required by at least one function, and the data storage region may store data created depending on the use of the device. Additionally, the memory 920 may include a high-speed random-access memory and may also include a nonvolatile memory such as at least one disk memory, a flash memory or another nonvolatile solid-state memory. In some examples, the memory 920 may include memories which are remotely disposed relative to the processor 910, and these remote memories may be connected to the device via a network. Examples of the preceding network include, but are not limited to, the Internet, an intranet, a local area network, a mobile communication network and a combination thereof.

The communication module 930 is configured to perform communication interaction between a first communication node and a second communication node.

The preceding device may be configured to perform the measurement method applied to the first communication node provided in any preceding embodiment and has corresponding functions and effects.

In the case where the device is the first communication node, the preceding device may be configured to perform the measurement method applied to the first communication node provided in any preceding embodiment and has corresponding functions and effects.

In the case where the device is the second communication node, the preceding device may be configured to perform the measurement method applied to the second communication node provided in any preceding embodiment and has corresponding functions and effects.

An embodiment of the present application further provides a storage medium including computer-executable instructions which, when executed by a computer processor, perform a measurement method applied to a first communication node. The method includes receiving a preset measurement condition configured by a second communication node; and enabling measurement on a neighbor cell corresponding to a serving cell where the first communication node is located according to the preset measurement condition.

An embodiment of the present application further provides a storage medium including computer-executable instructions which, when executed by a computer processor, perform another measurement method applied to a first communication node. The method includes sending uplink data carrying strongest neighbor cell information of the first communication node to a second communication node.

An embodiment of the present application further provides a storage medium including computer-executable instructions which, when executed by a computer processor, perform a measurement method applied to a second communication node. The method includes configuring a preset measurement condition, where the preset measurement condition is configured for enabling measurement on a neighbor cell corresponding to a serving cell where a first communication node is located; and sending the preset measurement condition to the first communication node.

The term user equipment encompasses any suitable type of wireless user equipment, such as a mobile phone, a portable data processing apparatus, a portable web browser or a vehicle-mounted mobile station.

In general, multiple embodiments of the present application may be implemented in hardware or special-purpose circuits, software, logic or any combination thereof. For example, some aspects may be implemented in hardware while other aspects may be implemented in firmware or software that may be executed by a controller, a microprocessor or another computing apparatus, though the present application is not limited thereto.

The embodiments of the present application may be implemented by computer program instructions executed by a data processor of a mobile apparatus, for example, implemented in a processor entity, by hardware or by a combination of software and hardware. The computer program instructions may be assembly instructions, instruction set architecture (ISA) instructions, machine instructions, machine-related instructions, microcodes, firmware instructions, status setting data or source or object codes written in any combination of one or more programming languages.

A block diagram of any logic flow among the drawings of the present application may represent program steps, may represent interconnected logic circuits, modules and functions, or may represent a combination of program steps with logic circuits, modules and functions. A computer program may be stored in a memory. The memory may be of any type suitable for a local technical environment and may be implemented using any suitable data storage technology, such as, but not limited to, a read-only memory (ROM), a random-access memory (RAM) and an optical memory device and system (a digital video disc (DVD) or a compact disc (CD)). Computer-readable media may include non-transitory storage media. The data processor may be of any type suitable to the local technical environment such as, but not limited to, a general-purpose computer, a special-purpose computer, a microprocessor, a digital signal processor (DSP), an application-specific integrated circuit (ASIC), a field-programmable gate array (FPGA) and a processor based on a multi-core processor architecture.

What is claimed is:

1. A measurement method, applied to a first communication node, comprising:

receiving a preset measurement condition configured by a second communication node; and enabling measurement on a neighbor cell corresponding to a serving cell where the first communication node is located according to the preset measurement condition;

wherein the preset measurement condition comprises: satisfying a trigger condition for enabling intra-frequency measurement or inter-frequency measurement;

wherein in the case where the trigger condition for enabling the intra-frequency measurement or the inter-frequency measurement is that a signal quality of the serving cell where the first communication node is located deteriorates, a method for determining the deterioration of the signal quality of the serving cell where the first communication node is located comprises a maximum number of repetitions of a Narrow Physical Downlink Control Channel (NPDCCH) being greater than or equal to a seventh preset threshold; and a retransmission rate of a Hybrid Automatic Repeat reQuest (HARQ) of a plurality of data packets being greater than or equal to a ninth preset threshold, wherein a ninth preset threshold for enabling the intra-frequency measurement is different from a ninth preset threshold for enabling the inter-frequency measurement;

wherein the method further comprises: reporting uplink data carrying a neighbor cell measurement state indication to the second communication node, wherein the neighbor cell measurement state indication comprises at least one of: an indication of satisfying the intra-frequency measurement or the inter-frequency measurement: or an indication of about to enable the intra-frequency measurement or the inter-frequency measurement;

wherein after the uplink data carrying the neighbor cell measurement state indication is reported to the second communication node, the method further comprises: determining an enabling occasion of the inter-frequency measurement, wherein a method for determining the enabling occasion comprises one of: using a first preset occasion after the uplink data is successfully sent as the enabling occasion; using an occasion of successfully receiving feedback information of the second communication node as the enabling occasion, wherein the feedback information of the second communication node comprises: Random Access Response (RAR), an HARQ feedback of Media Access Control-Control Element (MAC CE) or an HARQ feedback of Radio Resource Control (RRC) message; or using a second preset occasion carried in the uplink data as the enabling occasion.

2. The method of claim 1, further comprising:

determining an inter-frequency measurement occasion, wherein the inter-frequency measurement occasion comprises an occasion when the first communication node does not transmit data to the second communication node, or an occasion when the first communication node does not receive data from the second communication node;

wherein a method for determining the inter-frequency measurement occasion comprises one of: within a seventh preset time, a buffer of Radio Link Control (RLC) being empty; or a service delay being greater than or equal to a seventeenth preset threshold.

3. A non-transitory storage medium storing a computer program, wherein the computer program, when executed by a processor, causes the processor to perform the measurement method of claim 1.

4. The method of claim 1, wherein the method for determining the deterioration of the signal quality of the serving cell where the first communication node is located further comprises at least one of:

with a fourth preset time, a number of undetected Physical Downlink Control Channels (PDCCHs) being greater than or equal to a fifth preset threshold;

a number of continuously undetected PDCCHs being greater than or equal to a sixth preset threshold; or a maximum number of repetitions of a Narrow Physical Downlink Shared Channel (NPDSCH) being greater than or equal to an eighth preset threshold.

* * * * *